United States Patent
Snyder et al.

(10) Patent No.: US 11,867,044 B2
(45) Date of Patent: Jan. 9, 2024

(54) PROPPANT DISPENSING SYSTEM

(71) Applicant: Proppant Express Solutions, LLC, Denver, CO (US)

(72) Inventors: Cory Snyder, Denver, CO (US); Scott Joseph D'Agostino, Bozeman, MT (US); Marc Kevin Fisher, Castle Rock, CO (US); Matthew Oehler, Denver, CO (US); Kevin Smith, Denver, CO (US); Brian Dorfman, Denver, CO (US); Mark John D'Agostino, Bozeman, MT (US)

(73) Assignee: Proppant Express Solutions, LLC, Denver, CO (US)

( * ) Notice: Subject to any disclaimer, the term of this patent is extended or adjusted under 35 U.S.C. 154(b) by 0 days.

(21) Appl. No.: 17/721,786

(22) Filed: Apr. 15, 2022

(65) Prior Publication Data

US 2022/0333473 A1    Oct. 20, 2022

Related U.S. Application Data

(60) Provisional application No. 63/312,707, filed on Feb. 22, 2022, provisional application No. 63/176,523, filed on Apr. 19, 2021.

(51) Int. Cl.
*B65G 65/23* (2006.01)
*E21B 43/26* (2006.01)
*B65G 65/40* (2006.01)

(52) U.S. Cl.
CPC .......... *E21B 43/2607* (2020.05); *B65G 65/40* (2013.01)

(58) Field of Classification Search
CPC ........ B65G 65/23; B65G 65/40; B65G 65/32; B65G 65/34; B65D 88/30; B65D 88/022; B65D 88/56; E21B 43/2607

USPC .......................................... 414/421; 222/166
See application file for complete search history.

(56) References Cited

U.S. PATENT DOCUMENTS

| | | | | |
|---|---|---|---|---|
| 2,756,883 | A | * | 7/1956 | Schreck ................. B65G 65/23 254/31 |
| 2,822,113 | A | * | 2/1958 | Joiner, Jr. .............. B65G 65/23 222/173 |
| 2,943,754 | A | | 7/1960 | Keys |
| 5,302,073 | A | * | 4/1994 | Riemersma ............ B65G 65/23 414/292 |
| 5,528,485 | A | * | 6/1996 | Devilbiss ................ F25B 21/02 318/800 |

(Continued)

FOREIGN PATENT DOCUMENTS

| | | |
|---|---|---|
| GB | 962481 A | 7/1964 |
| GB | 1041940 A | 9/1966 |

OTHER PUBLICATIONS

International Search Report and Written Opinion of the International Search Authority issued by the U.S. Patent and Trademark Office for International Application No. PCT/US2022/025034 dated Jul. 26, 2022. (8 pages).

*Primary Examiner* — Charles P. Cheyney
(74) *Attorney, Agent, or Firm* — Haynes and Boone, LLP; Randall C. Brown; Michael J. Tobin

(57) ABSTRACT

A proppant container facilitates the transportation of wet sand for use in a hydraulic fracturing operation. The container is mounted in a cradle that tips downward in arcuate motion for discharge or proppant through a top opening The tipping mechanism may be driven by a system of gears or a hydraulic ram.

30 Claims, 28 Drawing Sheets

(56) References Cited

U.S. PATENT DOCUMENTS

| | | | |
|---|---|---|---|
| 7,118,319 B1* | 10/2006 | Debrunner | B65G 65/23 |
| | | | 414/421 |
| 9,758,082 B2 | 9/2017 | Eiden, III et al. | |
| 10,414,598 B2 | 9/2019 | McCloskey et al. | |
| 10,989,018 B2 | 4/2021 | Oehler et al. | |
| 11,104,510 B2* | 8/2021 | O'Neill | B66F 9/125 |
| 11,472,642 B2* | 10/2022 | Fourney | B65B 67/1233 |
| 2013/0022441 A1 | 1/2013 | Uhryn et al. | |
| 2013/0142601 A1* | 6/2013 | McIver | B60P 1/6418 |
| | | | 414/812 |
| 2014/0041322 A1* | 2/2014 | Pham | E21B 15/00 |
| | | | 52/745.18 |
| 2017/0021318 A1* | 1/2017 | McIver | B65D 88/32 |
| 2017/0291780 A1* | 10/2017 | Sherwood | B65G 65/40 |
| 2020/0048985 A1* | 2/2020 | Oehler | E21B 34/06 |
| 2020/0094727 A1* | 3/2020 | Kloepfer | B62D 53/06 |
| 2020/0346880 A1 | 11/2020 | Oren | |
| 2021/0130113 A1* | 5/2021 | Shepherd | B65G 65/40 |
| 2021/0387762 A1* | 12/2021 | Hoefler | B65G 65/40 |

\* cited by examiner

PROPPANT DISPENSING SYSTEM

RELATED APPLICATIONS

This application claims benefit of priority to U.S. Provisional Patent Application No. 63/176,523 filed Apr. 19, 2021, and U.S. Provisional Patent Application No. 63/312,707 filed Feb. 22, 2022, both of which are hereby incorporated herein by reference for all that they disclose.

BACKGROUND

Field of the Invention

The presently disclosed instrumentalities pertain to the field of containerized equipment for the transport of sand and, particularly, for the delivery of sand or other proppant for use in hydraulic fracturing operations.

Description of the Related Art

Hydraulic fracturing is a well-known well stimulation technique in which pressurized liquid is utilized to fracture rock in a subterranean reservoir. In the usual case, this liquid is primarily water that contains sand or other proppants that hold open fractures which form during this process. The resulting "frac fluid" may sometimes benefit from the use of thickening agents, but these fluids are increasingly water-based. Originating in the year 1947, use of fracturing technology has grown such that approximately 2.5 million hydraulic fracturing operations had been performed worldwide by 2012. The use of hydraulic fracturing is increasing. Massive hydraulic fracturing operations in shale reservoirs now routinely consume millions of pounds of sand. Hydraulic fracturing makes it possible to drill commercially viable oil and gas wells in formations that were previously understood to be commercially unviable. Other applications for hydraulic fracturing include injection wells, geothermal wells, and water wells.

The widespread use of hydraulic fracturing creates significant demand for sand and other proppants. Considering the Permian Basin alone, demand has recently increased by almost 70% year over year. The Permian is thought to have consumed approximately 10.8 billion pounds (about 5 billion kg.) of proppant in 2017. The most common proppant in use is sand. Sand suppliers typically mine or quarry the sand, sort it by size and dry the sand. The sand is then placed into containers and loaded onto trucks or rail cars for transport to a well site where there is a need for the sand. By way of example, U.S. Pat. No. 9,758,082 to Eiden III et al., which is hereby incorporated by reference to the same extent as though fully replicated herein, shows one system for containerizing the sand for use at a wellsite, as well as a conveyor sled for transporting the sand from the containers to a blending unit where frac fluid is mixed.

The cost of capital equipment for drying the sand is a limiting factor when developing new sand mining facilities. The price of sand reflects the cost of recouping this capital investment, together with transportation charges from mines that are increasingly remote from where the sand is used. Frac sand is primarily silicon dioxide in an unconsolidated form. The initial steps in the mining process require water to wash and begin sieve distribution, thus wetting the sand. The sand has a porosity that typically exceeds approximately 30% where all or part of this volume may be filled with water. The sand is mined when wet, sieved and dried for use as a proppant. The industry is just now in the process of learning to use wet sand as a proppant, such that the sand need not be dried. The problem with using wet sand has been that it tends to clog up the surface equipment used to transport and distribute the sand for use as a proppant. In addition to cost saving of not having to dry the sand, there are also environmental benefits. For a typical year of operations in the Permian basin alone, not drying the frac sand has the potential to avoid burning natural gas for the drying operation to an extent that about 890,000 tons (about 807,000 metric tons) less $CO_2$ would be discharged into the environment. This has about the same comparable effect as removing 250,000 cars from the roads.

SUMMARY

The instrumentalities disclosed herein overcome the problems outlined above and advance the art by improving systems for transporting and dispensing wet sand for use in a hydraulic fracturing operation.

In one aspect, where from about 4% to about 17% of the sand pore volume can retain water when sand is mined wet, the inclusion of water in wet sand increases the shipping cost by a negligible amount. Thus, there is no need to dry the sand to save weight and corresponding transportation charges. Past practices have, however, found it necessary to dry the sand for use in hydraulic fracturing due to the cohesiveness of wet sand contributing to operational problems. As used herein, "wet sand" means sand having at least about 1% by weight of water, and may include sand having at least about 2%, 4%, 6%, 8%, 10%, 12%, 14%, 16% or more by weight of water. Slurried systems having more than about 20% water by weight may facilitate the flow of sand.

According to one embodiment, the proppant dispensing system has a proppant container including a container frame supporting a proppant reservoir. The proppant reservoir has a top, a bottom, and one or more sidewalls defining a reservoir between the top and the bottom. The bottom is sealed to prevent flow of proppant from the reservoir through the bottom when proppant resides in the reservoir. The top is provided with means for permitting proppant to flow out from the reservoir when proppant resides in the reservoir and the proppant container is tipped. This means may be, for example, an opening that restricts flow exiting the reservoir or an opening that does not restrict flow.

In further aspects of what is disclosed, the proppant dispensing system may further include a cradle with dimensions complimentary to the proppant container for retention of the proppant container in the cradle. A support frame rises from ground beneath the support frame towards the cradle and supports the cradle in a manner permitting tipping motion of the cradle to a sufficient degree for flow of proppant from the reservoir when proppant resides in the reservoir and the proppant container is tipped. A tipping mechanism may be mounted between the cradle and the support frame. The tipping mechanism includes an actuator that is configured for selectively moving the cradle between a tipped position such that proppant flows from the reservoir when proppant resides in the reservoir and an untipped position such that proppant does not flow from the reservoir when proppant resides in the reservoir.

According to various aspects of the proppant container, the bottom may constitute a solid wall having no opening therethrough. The container frame may be a rectilinear frame having a plurality of upright elongate frame members and a plurality of horizontal elongate frame members. The one or more sidewalls may consist of a cylindrical sidewall. Alternatively, the one or more sidewalls may be a rectilinear structure made of a front sidewall, a rear sidewall opposed from the front sidewall, and a pair of opposed sidewalls each extending between the front sidewall and the rear sidewall.

In one aspect, a vibrator may be mounted on the proppant container to facilitate flow of proppant therefrom when the proppant container is tipped. It will be appreciated, however, that an operator may actuate the container in a manner that eliminates the need for a vibrator.

In one aspect, the cradle may have a first spindle on first side a second spindle on a second side remote from the first side, the first spindle and the second spindle may be placed in linear alignment permitting a tipping motion about an axis defined by the linear alignment of the first spindle and the second spindle. The cradle may have at least one brace rising from the support frame to support a first aperture in which the first spindle is received and at least one other brace rising from the support frame to support a second aperture in which the second spindle is received.

In one aspect, the tipping mechanism may include an arcuate rack mounted on one of the cradle and the support frame and a motor-driven pinion assembly mounted on the other of the cradle and the support frame.

In one aspect, the top may include a top wall with an opening therethrough. When the at least one sidewall is a cylindrical sidewall, the opening may be defined by a member running as a secant in parallel with the axis of rotation for tipping the proppant container. The cylindrical wall presents axis of symmetry with a diameter perpendicular to the axis of symmetry. The diameter defines an open cross-sectional area. The opening in the top may be provided with an area encompassing from about 10 percent to about 30 percent of the open cross-sectional area.

In one aspect, the at least one sidewall is covered with insulation. An insulative cap may be provided to cover the top, and the bottom may be covered also with insulation. A steam radiator of electric heat or other heat emitting device may be provided to heat the sand for cold weather use.

In one aspect, the at least one sidewall has a horizontal cross-section presenting a shape selected from the group consisting of: circular, square, rectangular, and combinations thereof.

In one aspect, the reservoir has an interior surface that may be lined with a material having a coefficient of friction against sand that is less than the coefficient of friction of steel against sand.

In one aspect, the proppant container may be sized to contain in the reservoir from about 20,000 pounds (about 9,000 kg.) of wet or dry sand to about 60,000 pounds (about 27,000 kg.) of wet or dry sand.

According to one embodiment, the proppant container described above is use in combination with other surface equipment for dispensing wet sand. By way of example, this may include a conveyor belt positioned to receive a flow of proppant discharging from the proppant container when the proppant container is tipped, and one or more additional proppant containers that are deployed along the conveyor belt and likewise positioned to discharge onto the conveyor belt when tipped.

In one aspect, the proppant dispensing system may utilize a means for determining an amount of proppant discharging from each of the proppant containers when tipped. This means may be, for example, load cells mounted on the cradle to assess the weight of each of the proppant containers over time. The means may also be an empirical correlation developed using input parameters selected from the group consisting of time, angle of declination when tipping, and moisture content of the proppant. The proppant dispensing system may also include a blending unit positioned to receive proppant that has been transported on the conveyor belt. The input parameters of the numerical model may then also include an amount of proppant exiting the blending unit.

The proppant dispensing systems may be deployed in various ensembles. For example, one such ensemble may include a central hopper having a plurality of sidewalls that slope inwardly towards a discharge opening. A conveyor belt may be positioned to receive proppant from the discharge opening. An ensemble of the proppant dispensing systems may then include a first bank formed as a first row including a first plurality of the proppant dispensing systems respectively positioned to feed proppant to the central hopper when tipped, and a second bank formed as a second row including a second plurality of the proppant dispensing systems respectively positioned to feed proppant to the central hopper when tipped. The first bank and the second bank may be located opposite one another across the central hopper for load balancing thereof.

DETAILED DESCRIPTION

There will now be shown and described, by way of non-limiting examples, various instrumentalities for overcoming the problems discussed above.

Figure 1:
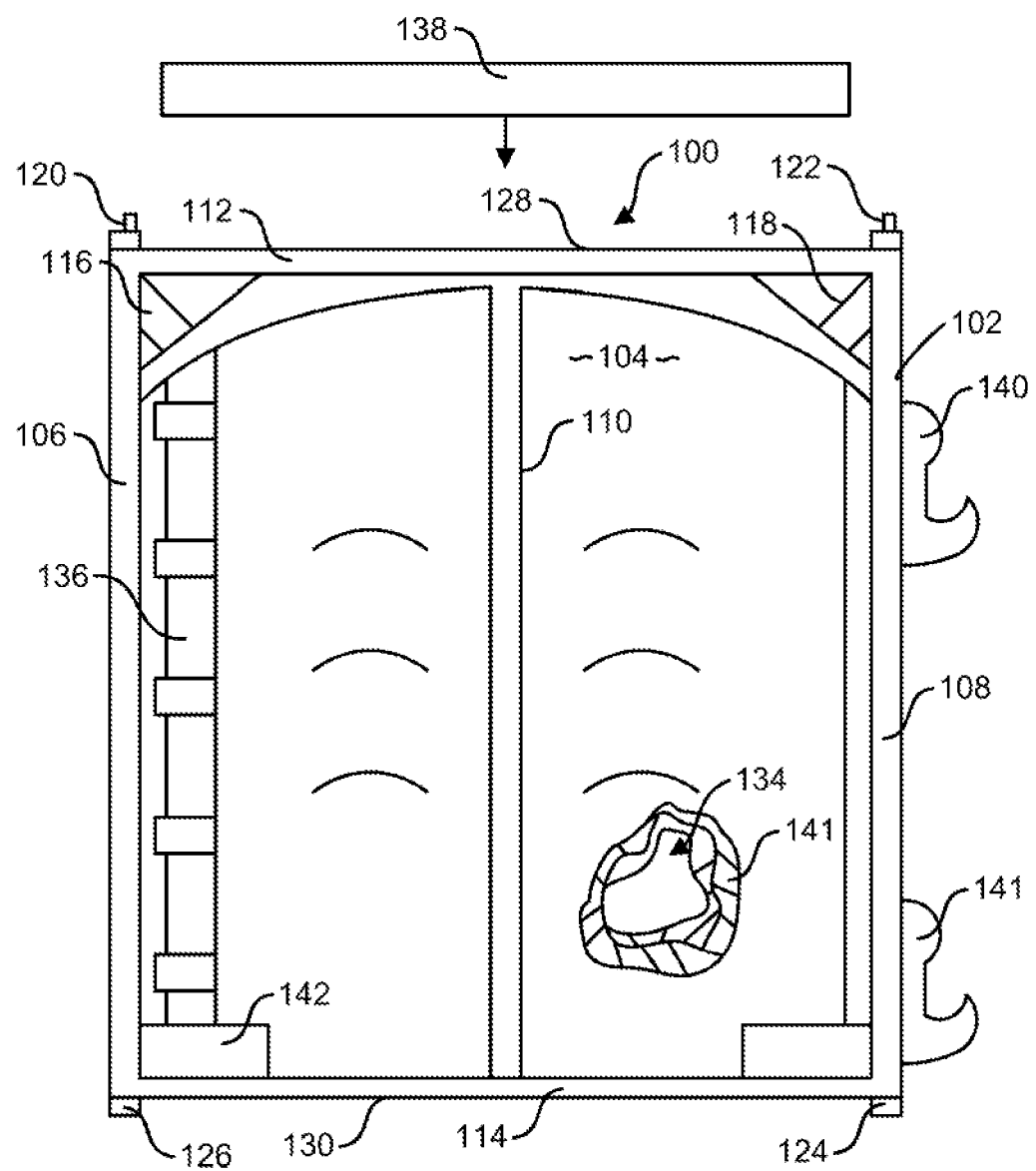
FIG. 1 shows a proppant container constructed for use in a proppant dispensing assembly according to the presently disclosed instrumentalities.

FIG. 1 shows side perspective view of a proppant container 100. A rectilinear frame 102 supports a sidewall 104. The rectilinear frame includes upright members 106, 108, 110 and horizontal members 112, 114, 116, 118. Intermodal connectors 120, 122, 124, 126 reside at the respective ends of upright members 106, 108, and the rectilinear frame 102 may have overall dimensions that are compatible with intermodal standards. The sidewall 104 is cylindrical and is supported by the rectilinear frame 102. A top 128 and a bottom 130 are attached to the cylindrical sidewall 104 to define an interior reservoir 134. As shown in FIG. 1, a portion of the cylindrical sidewall 104 is removed to reveal the interior reservoir 134, as well as insulation 141 that may optionally cover the cylindrical sidewall 104. A ladder 136 is optionally built onto the rear of the proppant container 104. The top 128 may optionally be covered with an insulative cap 138, and the bottom 130 may also be insulated. Heat cables (not shown) may be run beneath the insulation for purposes of heating wet sand or proppant to prevent freezing thereof in cold environmental conditions. Alternatively, the source of heat may be from steam or air. Hooks 140, 141 extend forward from the rectilinear frame 102. A forklift tube 142 passes through the cylindrical sidewall 104, and a pair of such tubes (not shown) are made to receive the tongs of a forklift for moving the proppant container 100 from place to place. The opposite side remote from what is shown in FIG. 1 is a mirror image thereof.

Figure 2:
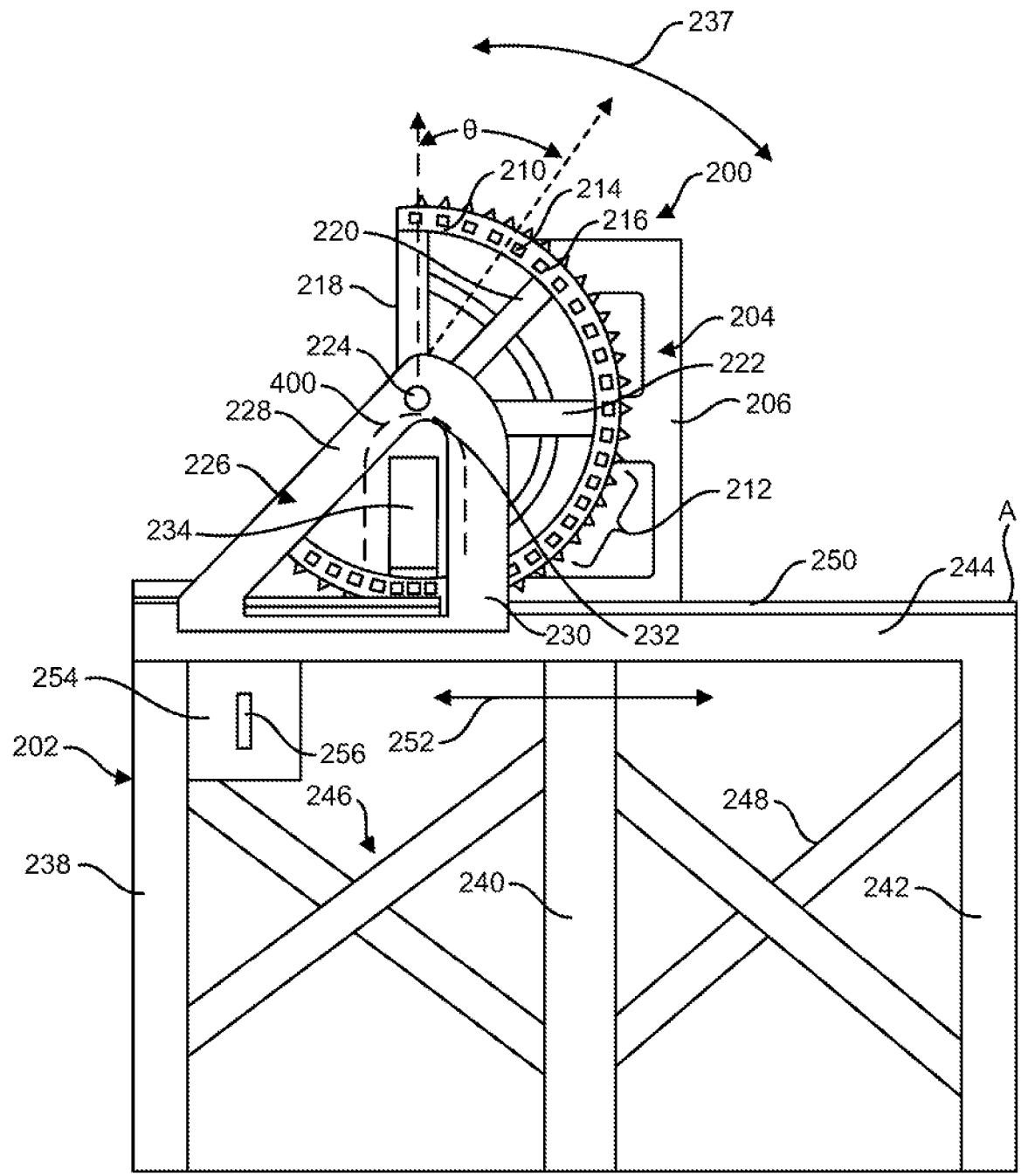
FIG. 2 shows a cradle mounted atop a rectilinear support stand such that the cradle may be used to tip the proppant container for discharge of proppant therefrom.

FIG. 2 shows a cradle 200 mounted atop a rectilinear support frame 202. The cradle 202 includes a cage 204 with dimensions complementary to the rectilinear frame 102 (FIG. 1) of the proppant container 100 for receipt of the proppant container 100 into the cage 204. The cage 204 includes a forward element 206 and a bottom element that retains the proppant container in position when inserted into the cage 204. An arcuate rack 210 is bolted to the cage 204 and has radially outboard teeth 212 together with cog receptacles 214, 216. A plurality of arms 218, 220, 222 extend inwardly from the arcuate rack towards a central spindle 224. A slide 226 includes bracing elements 228, 230 that meet at an aperture 232 which forms a journal bearing that permits rotational movement about the spindle 224. It will be appreciated that the opposite side of the cradle remote from what is shown in FIG. 2 is a mirror image thereof, and so also has as corresponding spindle (not shown) in linear alignment with the spindle 224 to form a pivot axis for the rotational tipping of cage 204.

The tipping motion of cage 204 is actuated by a motor-driven pinion or cog assembly 234, which is mounted to the slide 226. A cog 236 (FIG. 3) engages the cog receptacles 214, 216 of the arcuate rack 210 and rotates to actuate selective tipping motion of the cage 204 on path 237 relative to the slide 226.

The rectilinear support frame 202 is formed of upright members such as members 238, 240, 242, a horizontal beam 244, and cross-supports 248. A linear rack 250 resides atop the horizontal beam 244 and has gearing structure (not shown) complementary to the radially outboard teeth 212 of arcuate rack 210. The linearly outboard teeth 212 engage the rack 250 such that, as the cage 204 is pivoting on path 237 due to motive force provided by the cog 236, the slide 226 and the cage 204 are simultaneously translated on path 252. The movements are synchronized such that as pivoting motion tips the cage 204 forward on arcuate path 237 towards position A to increase angle θ as a departure from vertical, the slide 204 is also translating forward towards position A along the linear path 252. The range of motion for angle θ is suitably from about 0° to about 170° and is preferably from about 0° to about 145°. An operator panel 254 contains one or more levers 256 for selective actuation of the motor-driven pinion or cog assembly 234.

Figure 3:
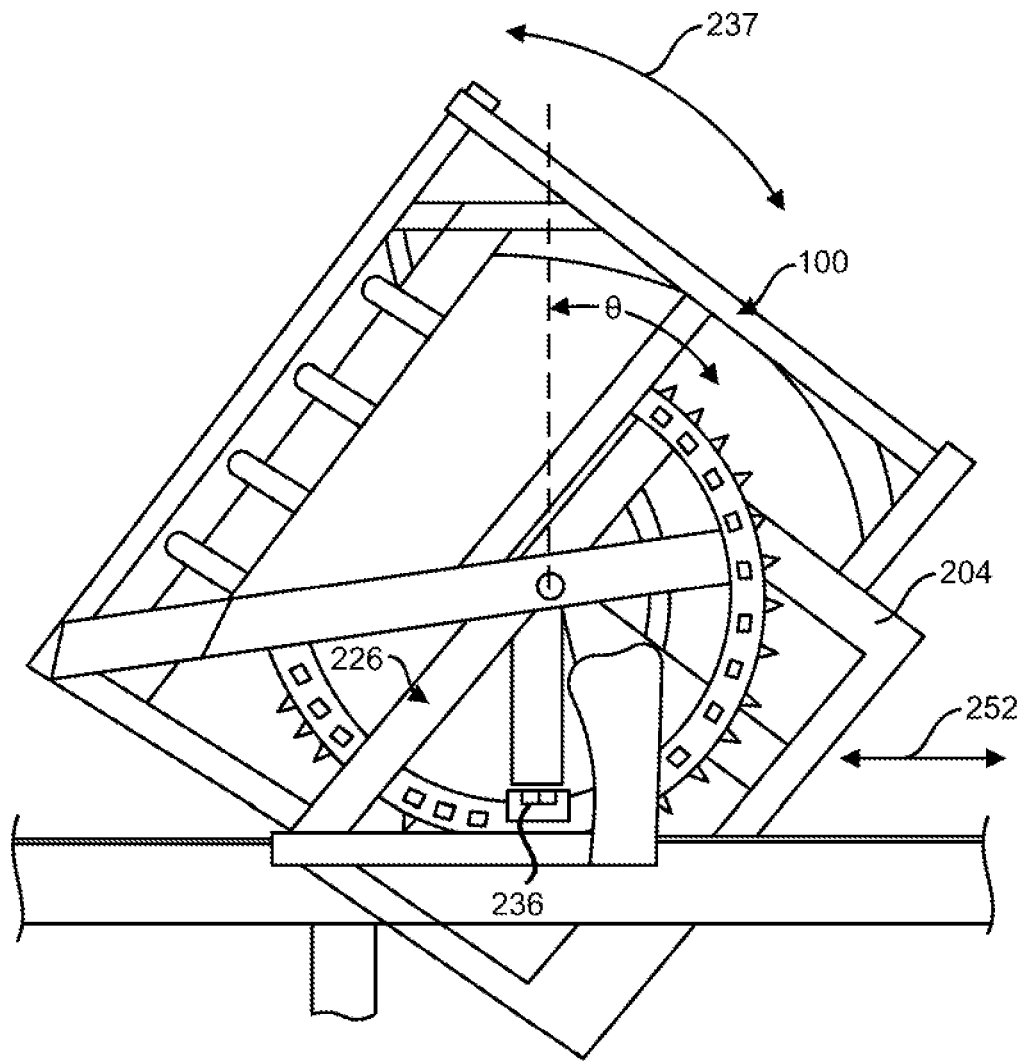
FIG. 3 shows the proppant container residing in the cradle as the proppant container is being tipped to the discharge of proppant.

FIG. 3 shows the proppant container 100 residing in cage 204, which is tipped forward by increasing angle θ relative to what is shown in FIG. 1. If wet sand were to not completely discharge from the proppant container 100, it will be appreciated that an operator may repeatedly actuate the proppant dispensing system including the proppant container 100, cradle 200 and support frame 202 shown in FIGS. 2 and 3 through tipping and forward translation on paths 237, 252 in a manner such that adhesion forces within the wet sand are broken by the momentum of these motions and loosening the packed sand within the proppant container 100.

Figure 4:
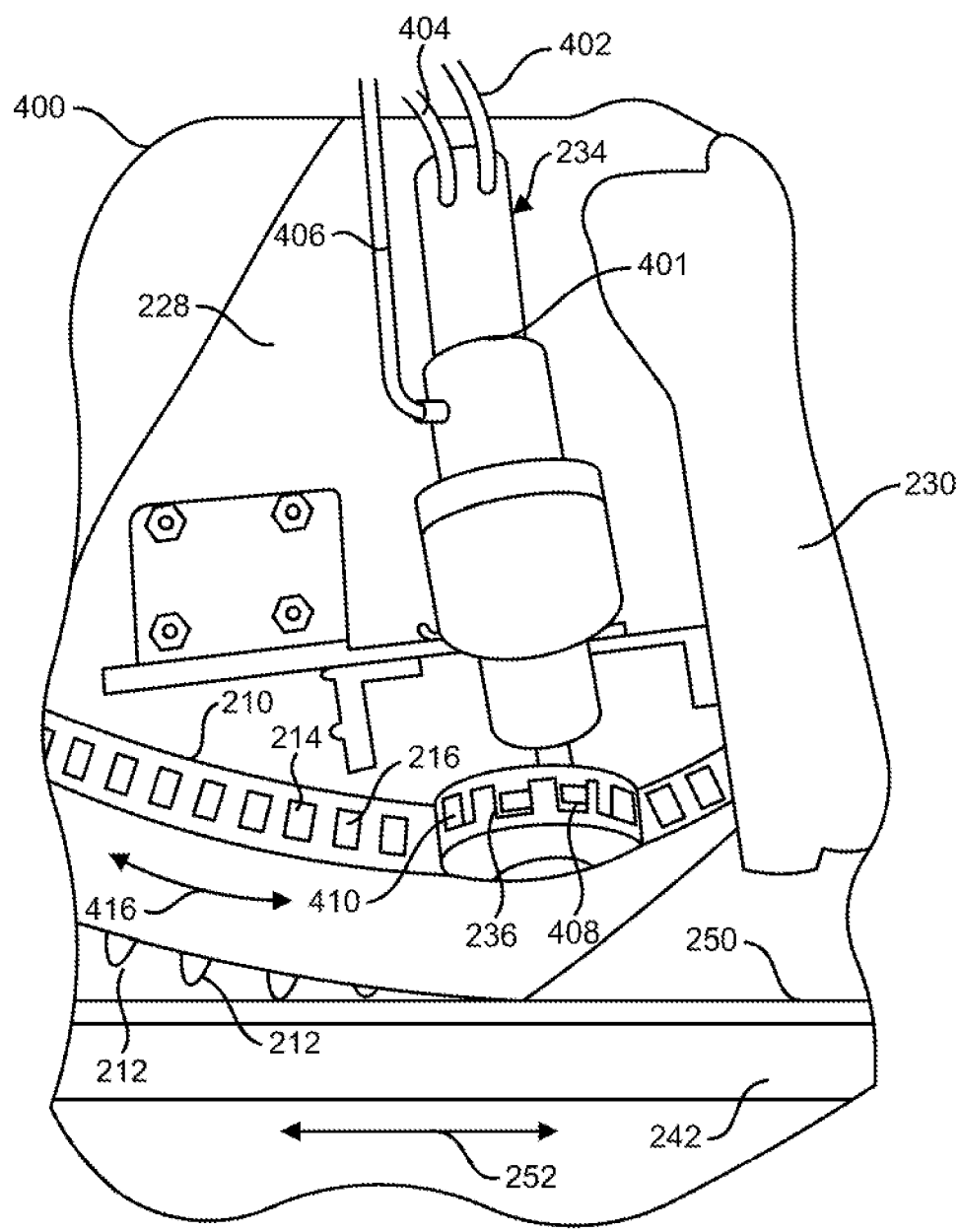
FIG. 4 shows enhanced detail with respect to FIG. 1 including a gearing system that actuates tipping of the proppant container on an arcuate path of motion and simultaneously moves the cradle on a linear path.

FIG. 4 provides additional detail with respect to area 400 of FIG. 2 showing the interaction between the motor-driven pinion or cog assembly 234 and the arcuate rack 210 for actuating the pivoting motion as shown in FIGS. 2 and 3. The cog 236 is actuated by a hydraulic motor 401 that is operably connected to hydraulic oil lines 402, 404, 406 for selective actuation of the hydraulic motor 401. It will be appreciated that the hydraulic motor 401 may alternatively be an electric motor, such as a step motor, or a pneumatic motor. The cog 236 has projections 408 that engage corresponding receptacles 214, 216 in arcuate rack 210 which causes the arcuate rack 210 to rotate in the direction indicated by arrows 416 when cog 236 is driven by hydraulic motor 401. Simultaneously, radially outboard teeth 212 engage the linear rack 250 for translation of the overall assembly on path 252.

Figure 5:
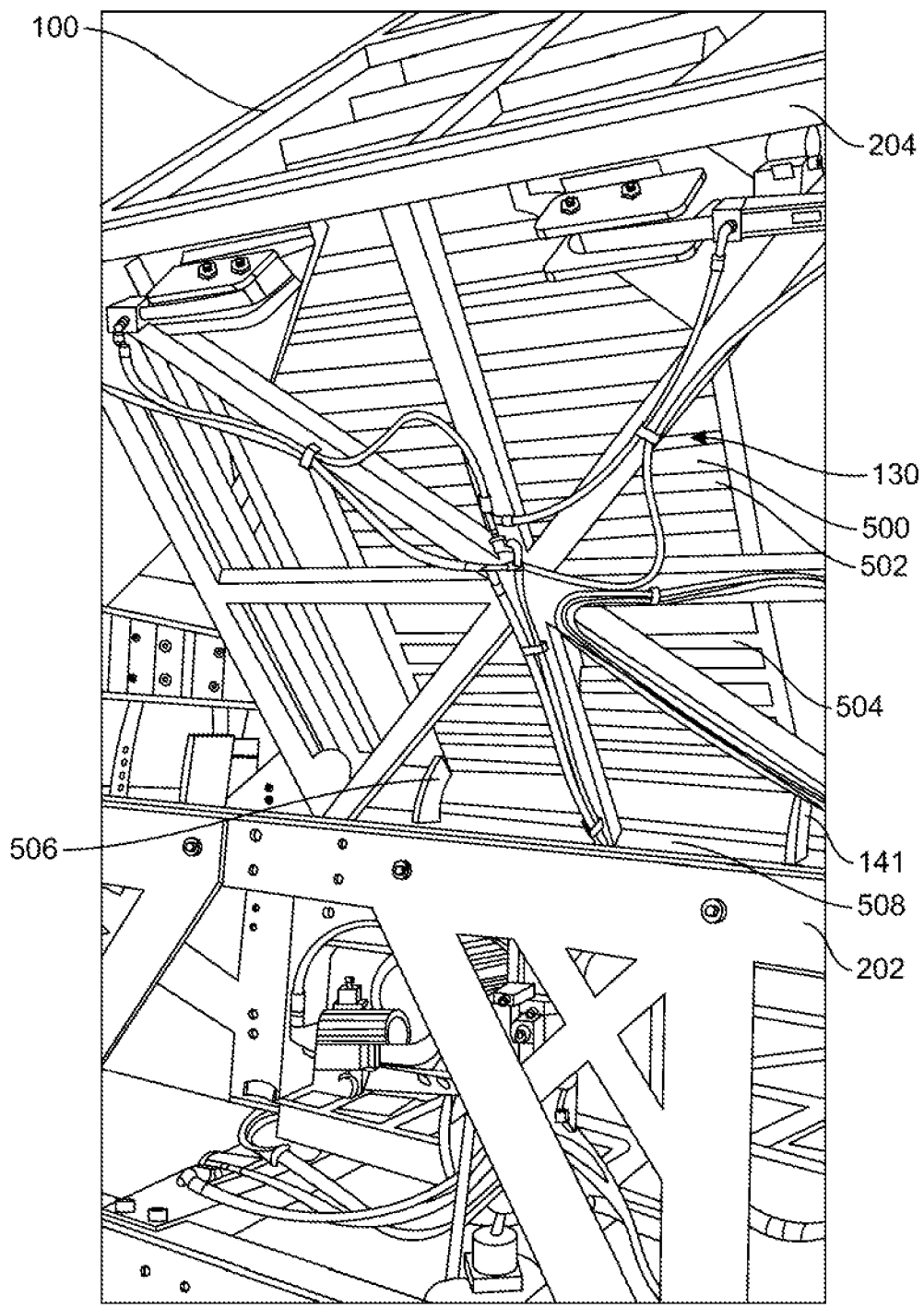
FIG. 5 is a rear perspective view showing the proppant container in the cradle atop the rectilinear support stand as the cradle is being tipped forward on an arcuate path while also being driven forward toward a point of discharge.
Figure 15:
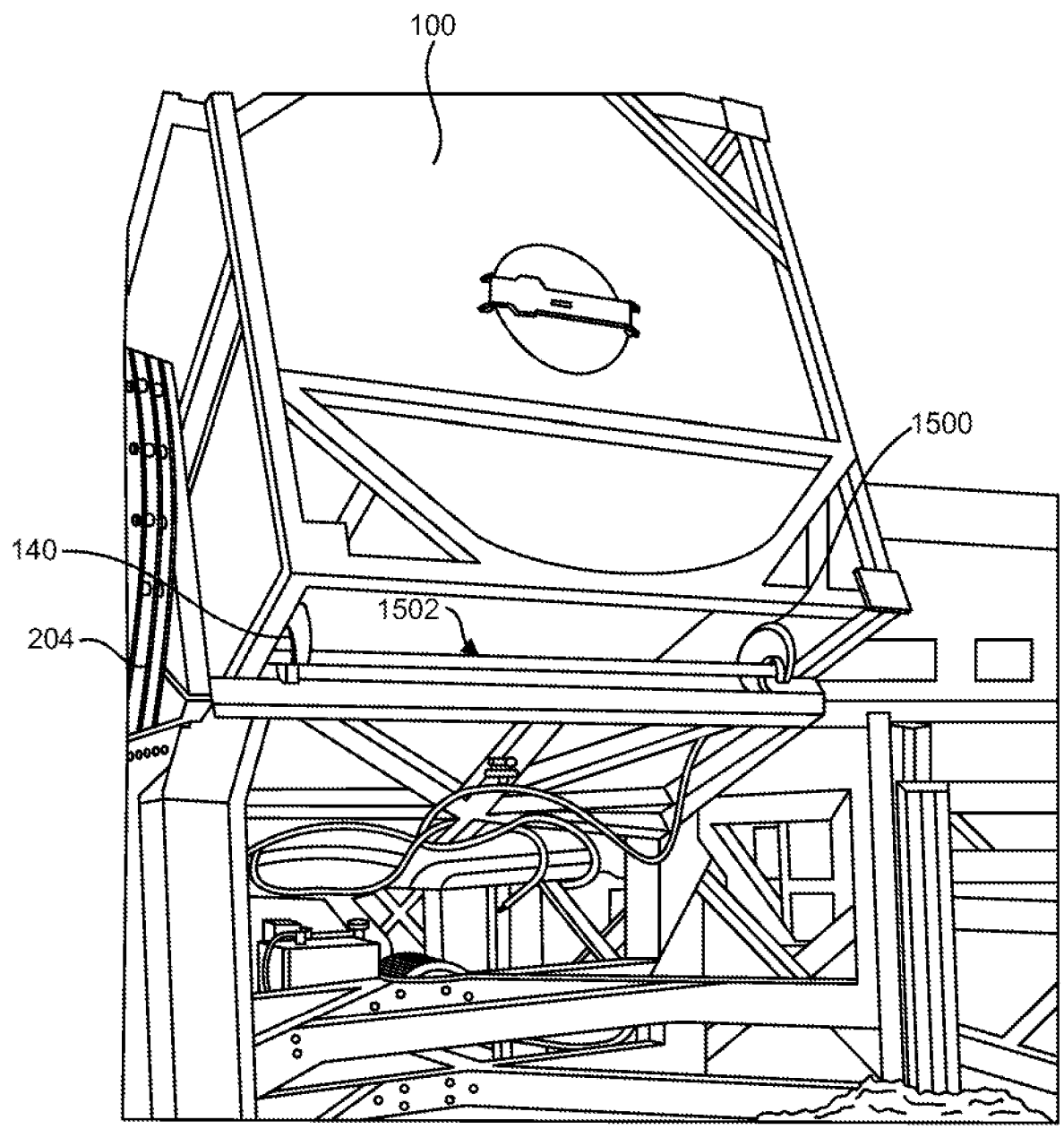
FIG. 15 is a front view of the proppant container during tipping motion with hooks of the proppant container retaining the proppant container in position on the cradle.

FIG. 5 shows a rear perspective view of the proppant container 100 residing in the cage 204 atop the rectilinear support frame 202 as the cage 204 is being tipped forward. Here is shown the bottom 130 of the proppant container, which is a solid wall 500 atop a plurality of transverse horizontal support ribs 502, 504. Bottom hooks 141, 506 are attached to the proppant container and engage a cross-bar 508 of the cage 204 to retain the proppant container 100 in the cage 204 when the cage 204 is tipped to an angle θ (FIGS. 2 and 3) that departs from vertical by more than about 90°. FIG. 15 shows top hooks 140, 1500, which are attached to the proppant container 100, engaging a cross-bar 1502 attached to the cradle 204 for additional retention of the proppant container 100 in the cage 204.

Figure 6:
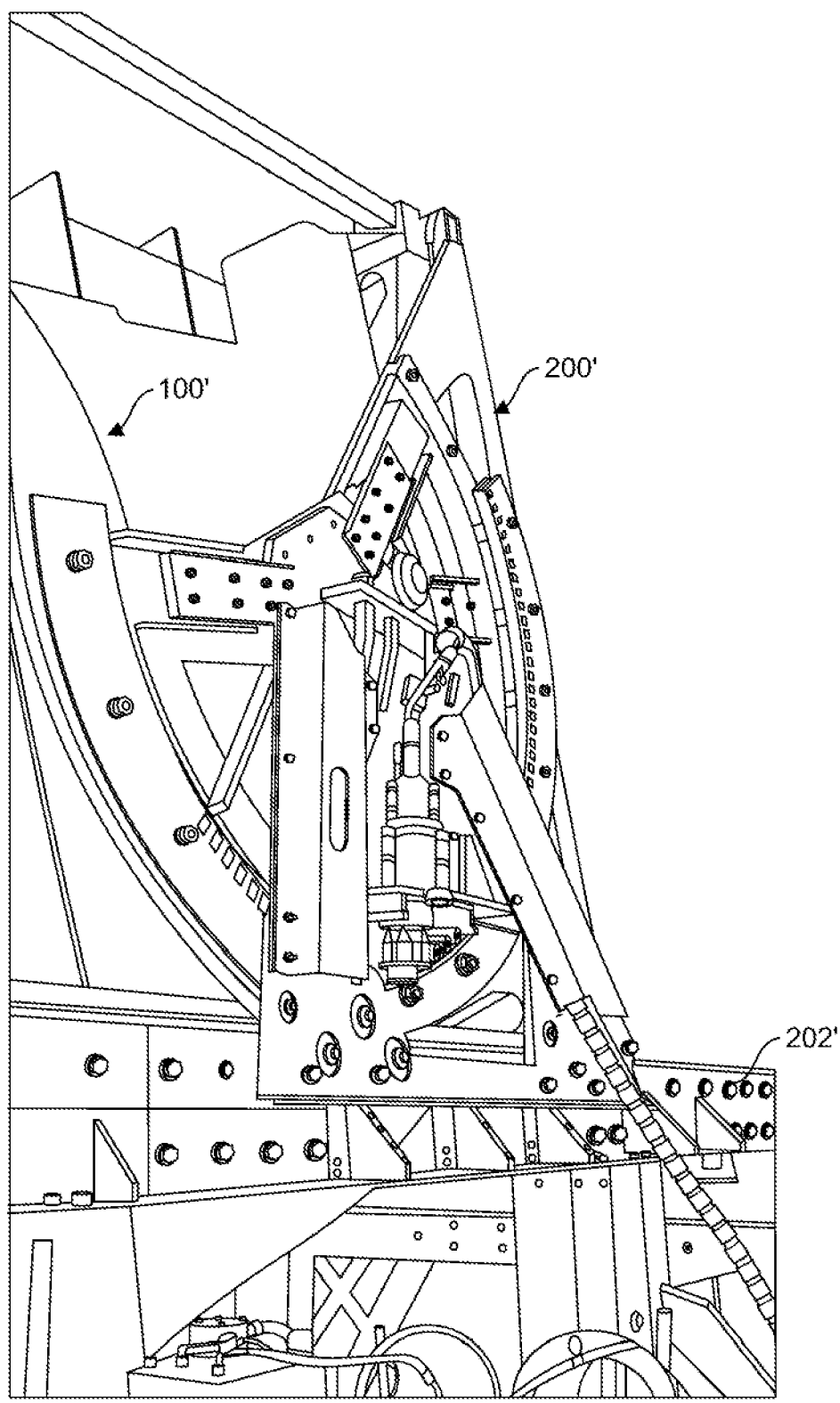
FIG. 6 is a side perspective view showing a mirror image of components also shown in FIG. 3, but as the proppant container is being tipped for the discharge of proppant.

FIG. 6 shows mirror images 100', 200' and 202' respectively of the proppant container 100, cradle 200 and rectilinear support frame 202' as mentioned above in the discussion of FIGS. 1 and 2.

Figure 7:
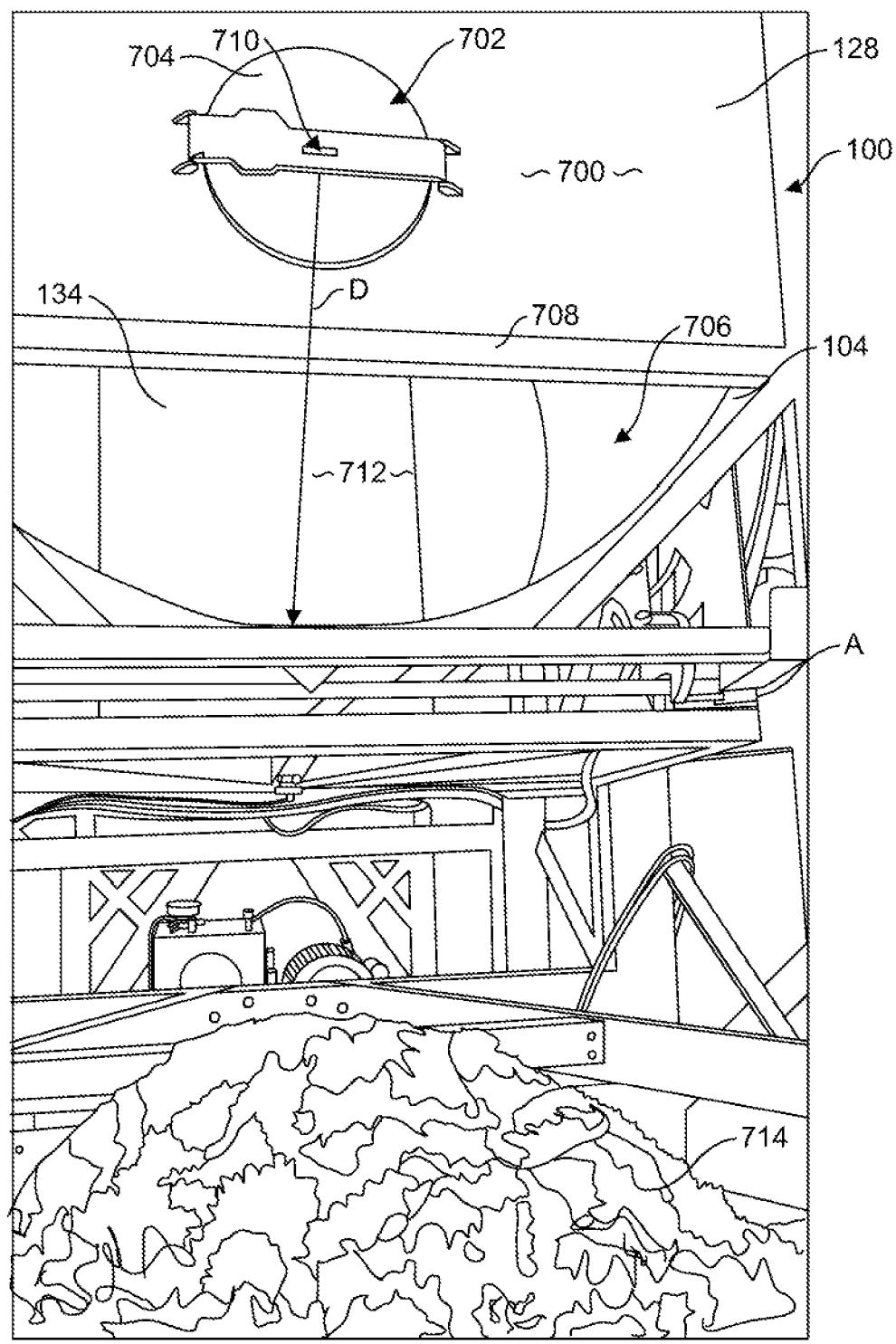
FIG. 7 is a front view showing the proppant container being raised as it is tipped backwards after having discharged proppant from a reservoir within the proppant container.

FIG. 7 shows the top 128 of the proppant container 100, which is tipped down to position A such that the angle θ (see FIGS. 2 and 3) is about 90°. In some embodiments, the top 128 may be completely open. In other embodiments, the top 128 could include a sliding hatch (not shown) that would enable a large opening on top during the fill operation. As shown in FIG. 7, the top 128 is a wall 700 with a central opening 702 that is sealed by a loading gate 704. The central opening 702 is provided to accept a snorkel for filling the proppant container 100 with sand in the same manner that proppant containers of the prior art Eiden-class are also filled. An opening 706 is cut from the wall 700 along the line of brace 708, which forms a secant with respect to the cylindrical cross-section of the cylindrical sidewall 104. The cylindrical sidewall 104 has an axis of symmetry seen at point 710 running perpendicular to internal diameter D. The internal diameter D may be used to determine a cross-sectional area of the cylindrical sidewall. Similarly, the opening 706 defines an area 712. The area 712 comprises a percentage of the total internal cross-sectional area determined according to the internal diameter D. This area 712 may be suitably from about 10 percent to about 30 percent of the total cross-sectional area of the cylindrical sidewall if it is desirable to have a flow restriction in place to prevent uncontrolled spillage of sand from the reservoir 134 as the proppant container is tipped. As shown in FIG. 7, the proppant container has previously been tipped to an angle θ (FIGS. 2 and 3) of about 135° in order to discharge wet sand 714 from within the reservoir 134, and the empty container 100 is being tipped away from position A for a return to the state as shown in FIG. 1 where the angle θ (FIGS. 2 and 3) is about 0°.

Figure 8:
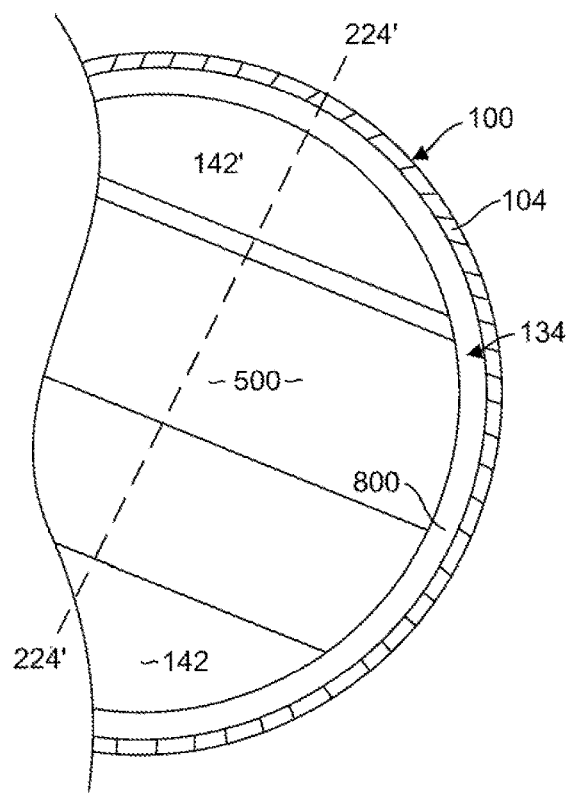
FIG. 8 is a midsection view of the proppant container showing internal components of forklift tube within the reservoir of the proppant container.

FIG. 8 is a midsection view of the proppant container 100 taken from the top perspective. Forklift tubes 142, 142' pass through the reservoir 134 and reside atop the bottom wall 500. The interior 800 of cylindrical sidewall 104 may be coated with a friction reducing material, such as a thin layer of nitrided steel where the cylindrical sidewall is made of steel. The nitrided steel is also very hard and protects against abrasion form moving sand. Any such coating should have a coefficient of friction against sand that is less than the coefficient of friction of steel against sand.

Figure 9:
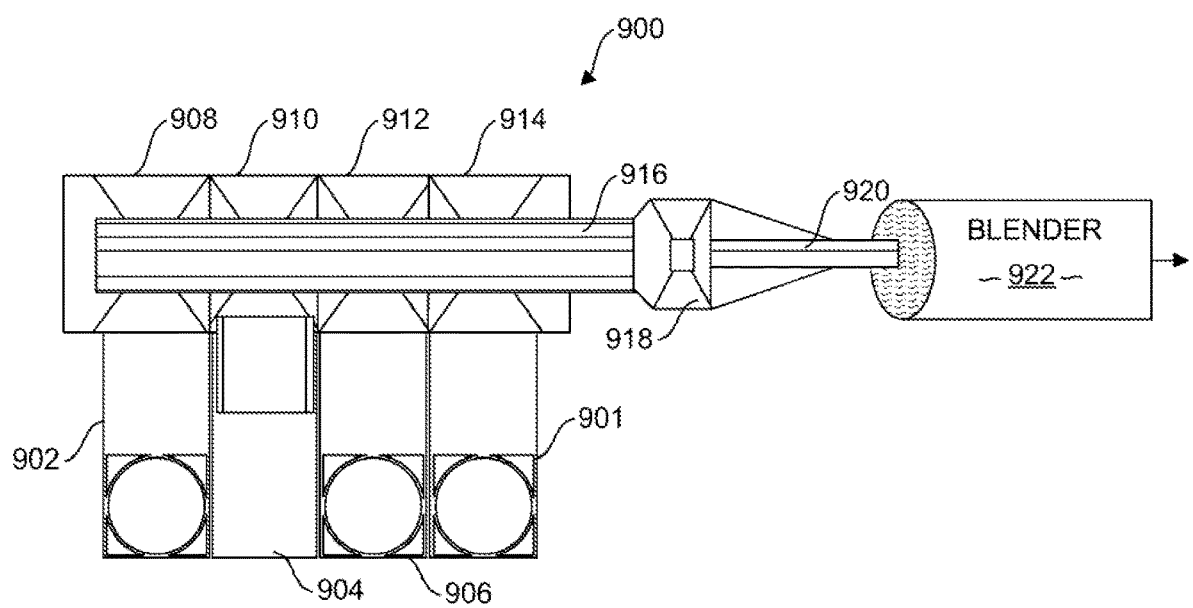
FIG. 9 is a top view of a first layout in which a plurality of proppant dispensing systems or assemblies discharge onto a common conveyor to dispense proppant ultimately to a blending unit used in a hydraulic fracturing operation.

FIG. 9 shows a proppant dispensing system layout 900 including plurality of proppant dispensing assemblies 901, 902, 904, 906, each including a proppant container 100, cradle 200 and rectilinear support stand 202 as shown in FIGS. 1, 2, and 3. Each of the proppant dispensing assemblies 901, 902, 904, 906 is positioned to discharge proppant into a corresponding one of hopper loading stations 908, 910, 912, 914 which collectively form a single hopper that runs the length of dispensing assemblies 901, 902, 904, 906. The hopper loading stations 908-914, in turn, guide the gravity flow of proppant (not shown) for discharge onto a horizontal conveyor belt system 916. In one embodiment this conveyor belt system 916 may for example include a high tension conveyor belt.

The horizontal conveyor belt system 916 carries the proppant toward a surge hopper 918 or blender hopper, which discharges onto a second conveyor 920, which lifts the proppant into a blending unit 922. The second conveyor 920 replaces traditional auger mechanisms that are traditionally used to move dry sand from hopper to the blending unit 922 because it has been determined that the traditional auger designs have frequent failures when moving wet sand in the intended environment of use. The blending unit 922 mixes the proppant to form a 'frac fluid' as is known in the art. As shown in FIG. 9, the proppant dispensing assembly 904 has been tipped and rotated forward for the discharge of proppant as shown in FIG. 7. The remaining proppant dispensing assemblies 901, 902, 906 have proppant containers 100 (not shown) in the upright position, e.g., where the angle θ is about 0° (see FIGS. 2 and 3).

It will be appreciated that in the intended environment of use a large hydraulic fracturing operation may consume upwards of about ten million pounds (about 4.5 million kg.) of sand per day. If the proppant containers 100 are sized to hold about 20,000 lbs. (about 9,000 kg.) of sand, this equates to about 500 proppant containers 100 per day, or one proppant container 100 discharging in less than three minutes. The layout 900 places the proppant dispensing assemblies 901, 902, 906 in a position where empty ones can be removed and replaced with filled proppant containers 100, such that fresh proppant may be continually supplied to the conveyor belt system 916.

Figure 10:
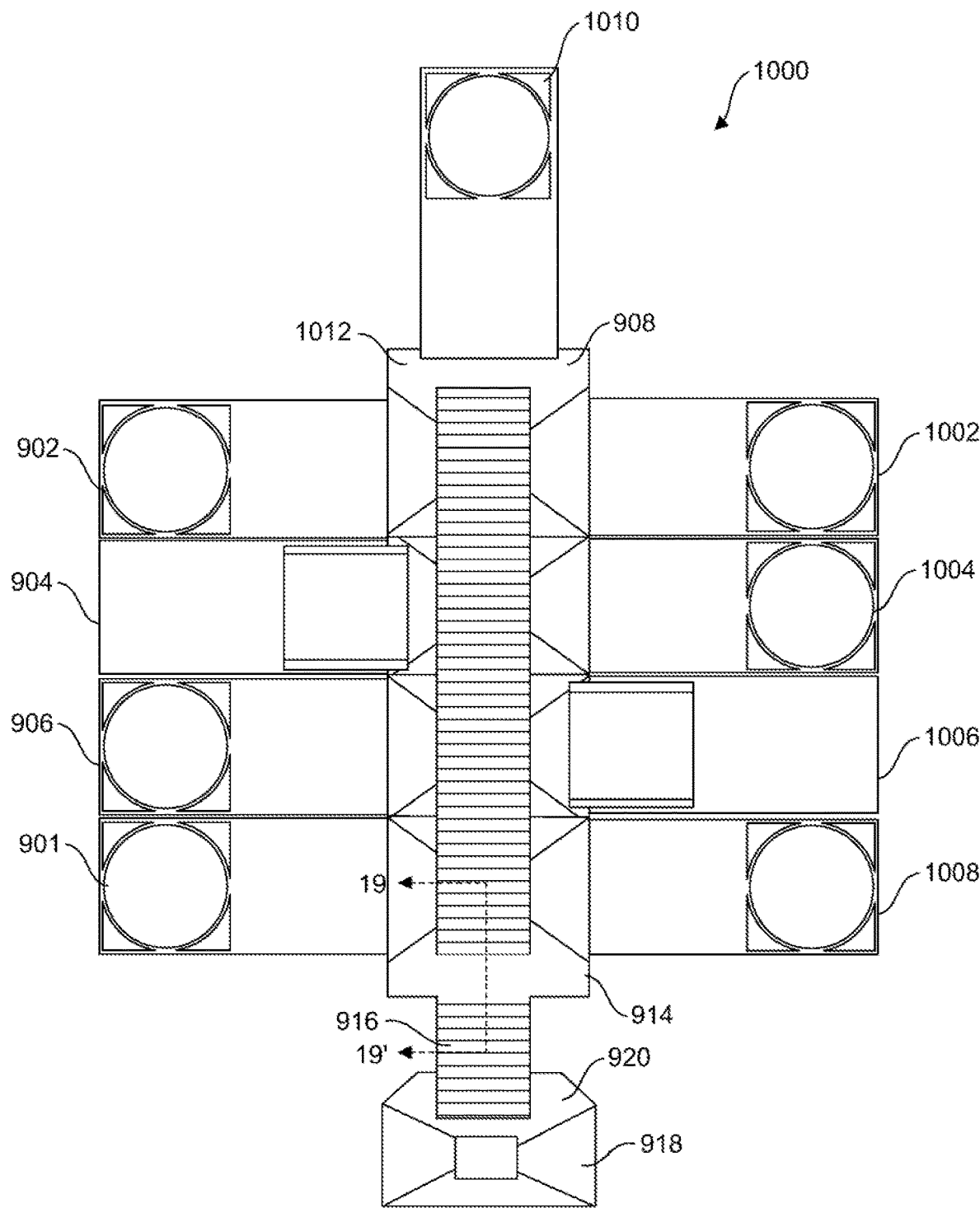
FIG. 10 is a top view of a second layout that is densified with respect to that of FIG. 9 by the addition of more proppant dispensing assemblies.

FIG. 10 shows a relatively denser layout 1000 where additional proppant dispensing assemblies 1002, 1004, 1006, 1008, 1010 are also positioned to discharge onto the conveyor belt system 916 within an elongate rectangular hopper 1012. In this configuration sequencing of tipping proppant dispensing assemblies positioned opposite one another, for example, as in the case of proppant dispensing assemblies 904, 1004, should alternate such that when fully tipped they do not collide with one another.

Figure 11:
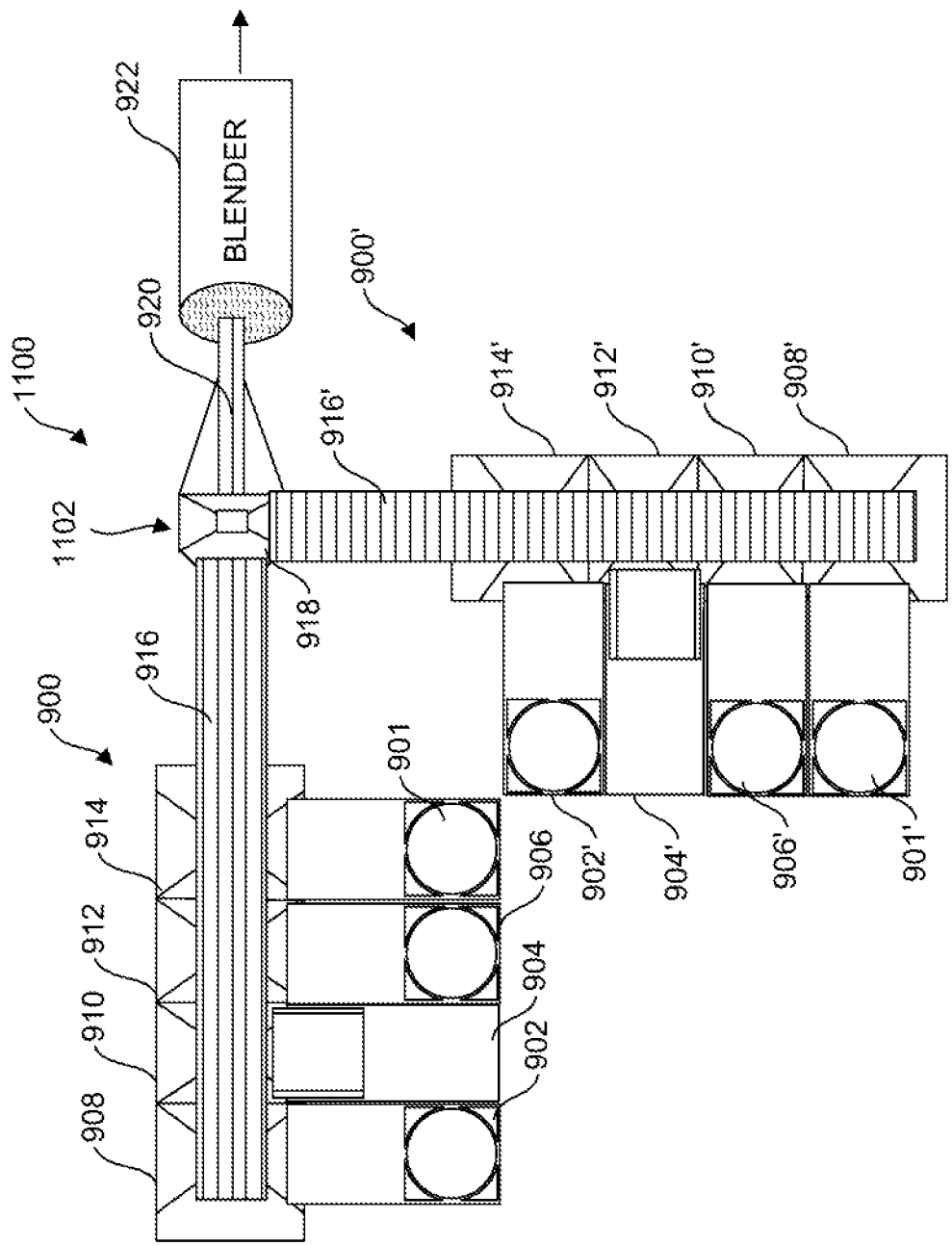
FIG. 11 is a top view of a third layout that combines two of the layouts shown in FIG. 9.

FIG. 11 shows a layout 1100 where the layout 900 as shown in FIG. 9 is replicated as layout 900' including additional proppant dispensing assemblies 901', 902', 904', 906'; additional hoppers 908', 910', 912', 914' and an additional conveyor belt system 916'. The layouts 900, 900' are positioned with the conveyor belt systems 916, 916' running at right angles to one another such that a third such layout (not shown) may be put at position 1102, if desired.

Figure 12:
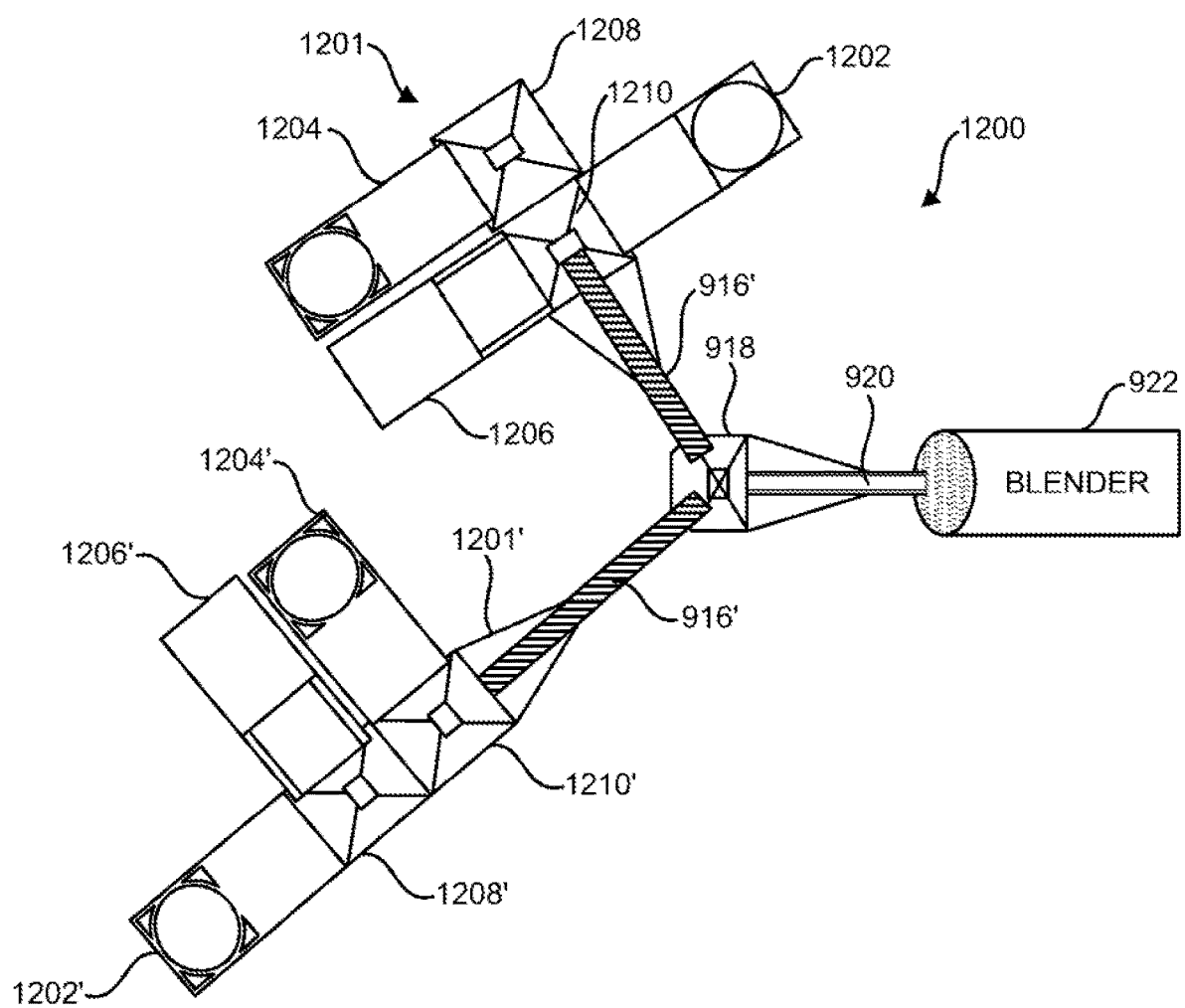
FIG. 12 is a top view of a fourth layout including a scissortail arrangement of two identical equipment ensembles.

FIG. 12 shows a scissortail layout 1200 formed of a first ensemble 1201 and a second ensemble 1201'. The ensemble 1201 includes proppant dispensing assemblies 1202, 1204, 1206 discharging into respective ones of hoppers 1208, 1210 to feed the surge hopper 918, conveyor 920 and blender 922. The proppant dispensing assemblies 1202-1206 may, for example. each include the proppant container 100, cage 200 and support frame 202 shown in FIGS. 2 and 3. The ensemble 1201' has identical components with respect to those of ensemble 1201, the numbers here being designated with a prime mark to show an identical component of like numbering with respect to ensemble 1201. The conveyor belt systems 916, 916' feeding surge hopper 918 do not run at right angles with respect to one-another but are deployed in a scissortail arrangement co-terminating at surge hopper 918.

Figure 13:
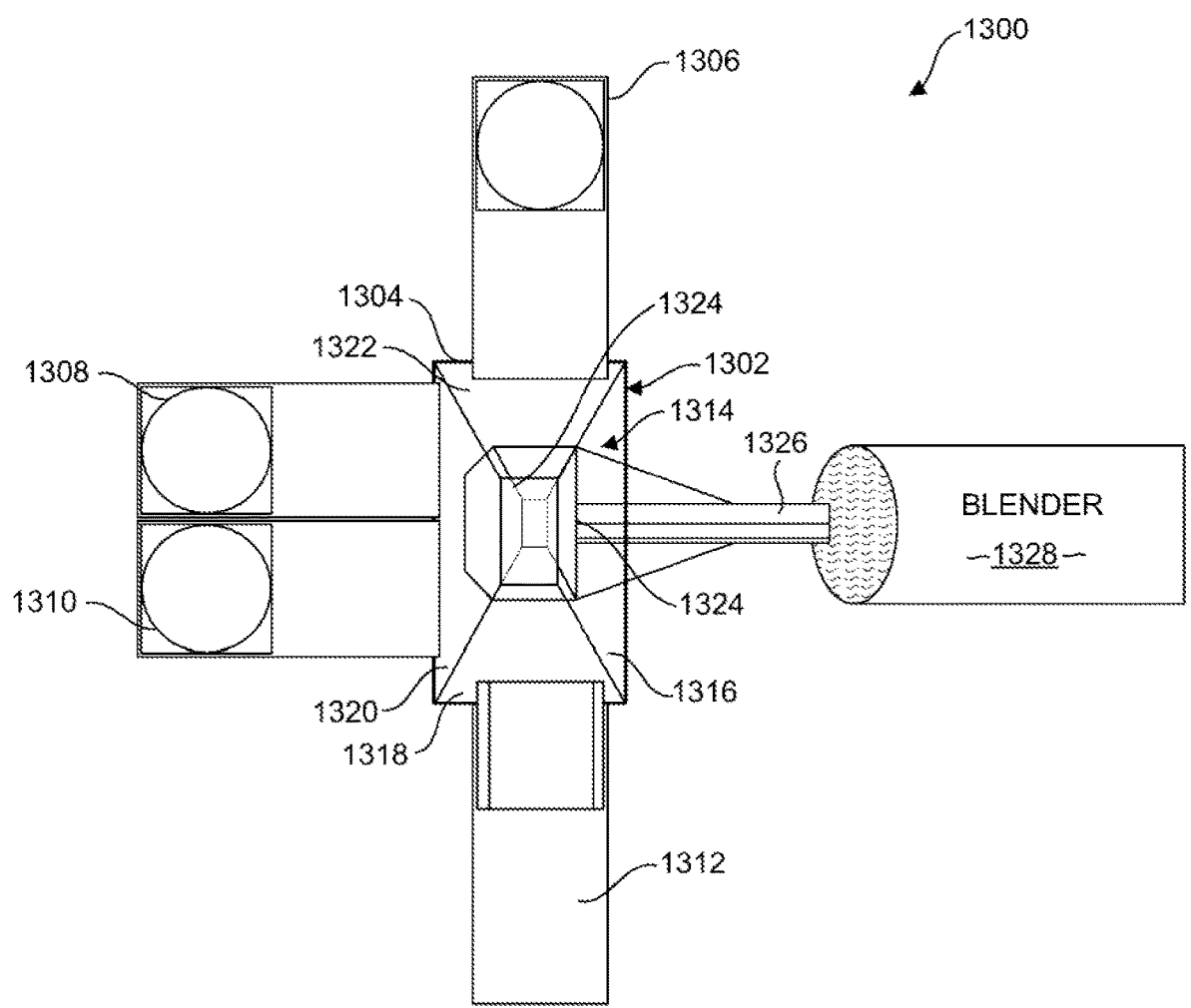
FIG. 13 is a top view of a fifth layout including an arrangement of proppant dispensing assemblies that discharge directly into a common surge hopper, thereby avoiding the need for use of a horizontal conveyor belt system.

FIG. 13 shows a layout 1300 including a gathering hopper 1302 with a periphery 1304 around which are deployed a plurality of proppant dispensing assemblies 1306, 1308, 1310, 1312 for the discharge of proppant (not shown) into a common interior space 1314. Sidewalls 1316, 1318, 1320, 1322 taper downwardly and inwardly towards a discharge opening 1324. The discharge opening 1324 discharges onto an elevator or metering conveyor 1326 that lifts proppant for discharge into a blender 1328. The layout 1300 does not utilize a horizontal conveyor because the conveyor 1326 lifts proppant directly into the blender 1328. The layout 1300 occupies an area or 'footprint' that is advantageously smaller than the layout 900 and utilizes the same number of proppant dispensing assemblies.

Figure 14:
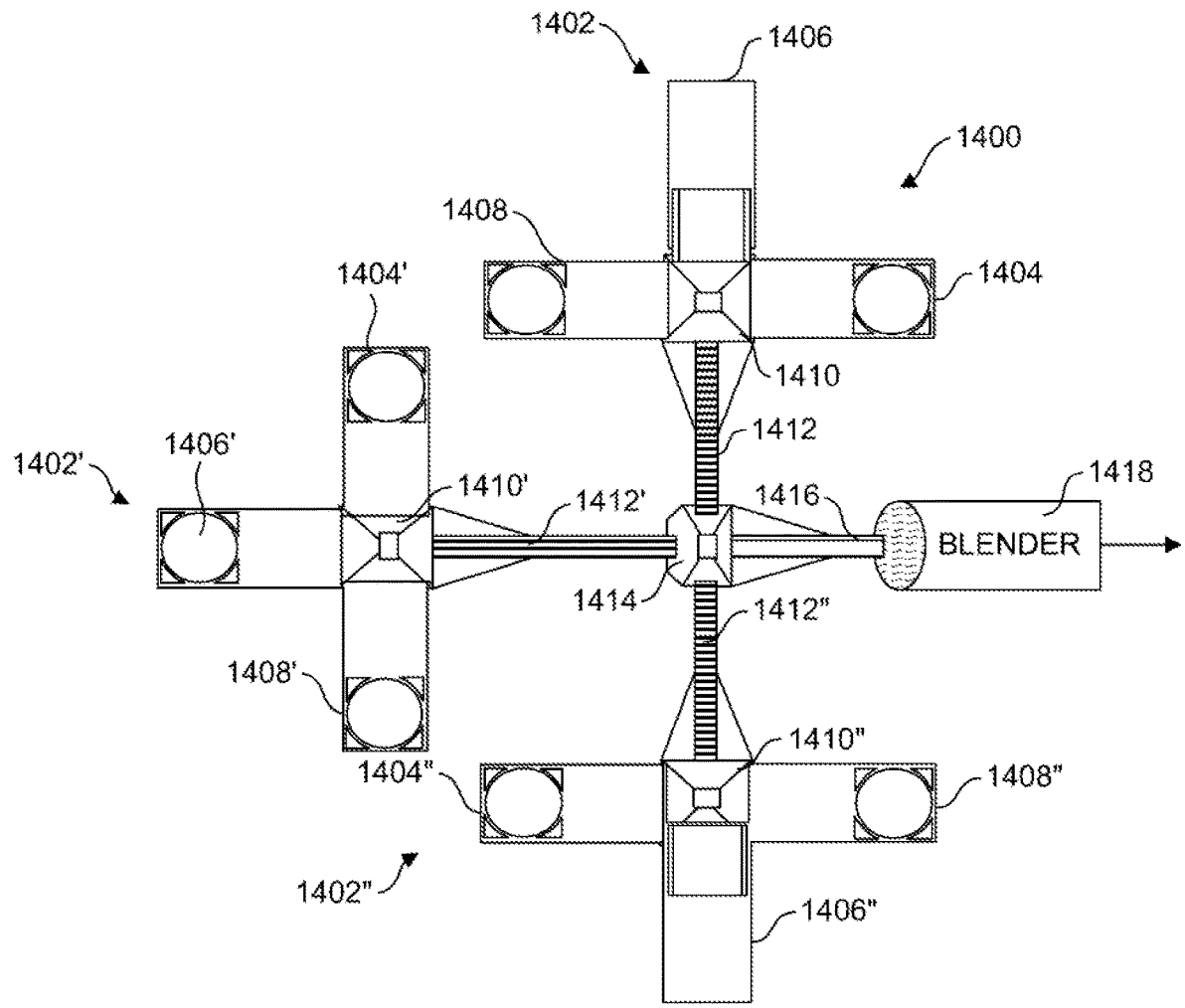
FIG. 14 is a top view of a sixth layout of three identical equipment ensembles oriented at right angles with respect to one another.

FIG. 14 shows a layout 1400 formed of ensembles 1402, 1402' and 1402". The use of prime and double prime designators on identical numbers indicates the use of correspondingly identical components in each ensemble. Proppant dispensing assemblies 1404, 1404', 1404", 1406, 1406', 1406", 1408, 1408', 1408" are located at positions to feed into respective central hoppers 1410, 1410', 1410", which in turn discharge onto respective horizontal conveyor belts 1412, 1412', 1412" that feed a central surge hopper 1414. Each of the various proppant dispensing assemblies 1404-1408, 1404'-1408', and 1404"-1408" may, for example, include the proppant container 100, cage 200 and support frame 202 shown in FIGS. 2 and 3. The central surge hopper 1414 feeds a conveyor 1416 that lifts proppant for discharge into bending unit 1418.

Figure 16:
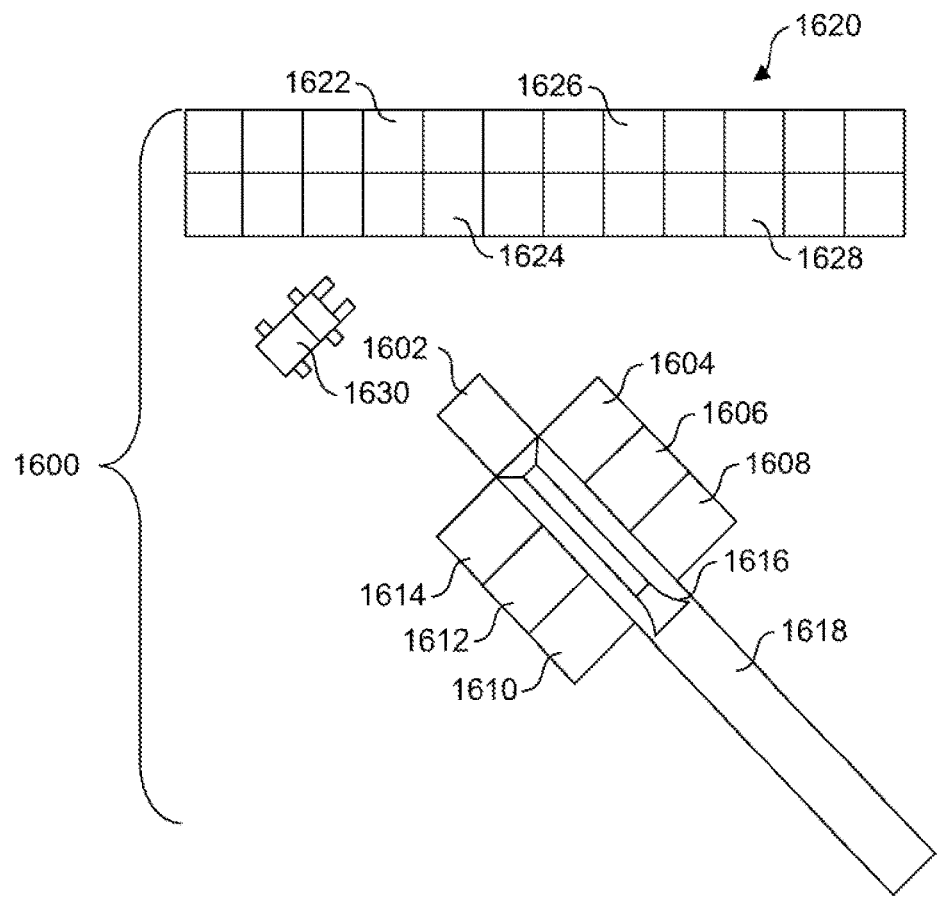
FIG. 16 is a top view of a seventh layout of a plurality of proppant dispensing assemblies positioned at the periphery of a common or shared hopper for the discharge of proppant into the shared hopper.

FIG. 16 shows a layout 1600 of proppant dispensing assemblies 1602, 1604, 1606, 1608, 1610, 1612, 1614 positioned to discharge into a common or shared hopper 1616. The proppant dispensing assemblies 1602-1614 may, for example, each include the proppant container 100, cage 200 and support frame 202 shown in FIGS. 2 and 3. The shared hopper 1616, in turn, discharges downwardly onto a conveyor (not shown) located below shared hopper 1616 that moves the hopper content toward one end of the hopper and a restricted outlet port at bottom edge on the same end. This restriction is adjustable to establish a defined ribbon thickness that exits shared hopper 1616 and its conveyor. The defined ribbon of sand falls onto a second conveyor 1618 that lifts proppant for discharge into a bending unit (not shown). The second conveyor also acts as a metering conveyor using a weigh in motion system that communicates with the blending unit transmitting information that is translated into real time sand demand.

A stack 1620 is formed of a plurality of proppant containers, for example, proppant containers 1622, 1624, 1626, 1628, each of which may be identical to the proppant container 100 described above. The proppant containers 1620-1628 may be filled with wet or dry sand. It will be appreciated that, when the respective proppant containers in use on the proppant dispensing assemblies 1602-1614 have emptied their contents into the hopper 1616, one or more forklifts 1630 may be utilized to remove these empty containers and replace them with filled containers from the stack 1620. Any of the layouts 900, 1000, 1100, 1200, 1300, 1400 may also make use of a stack 1620 and forklifts 1630. In the intended environment of use, it is contemplated that a plurality of forklifts 1630 will be in use.

Figure 17:
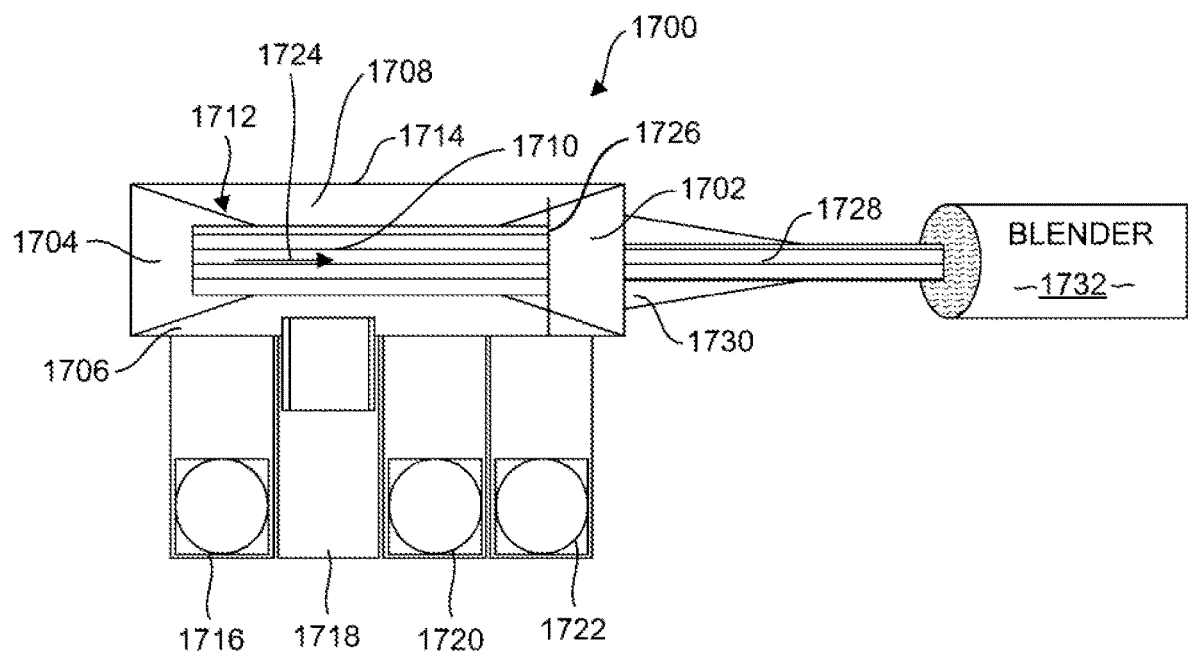
FIG. 17 is a top view of a layout where a plurality of proppant dispensing assemblies are configured to discharge proppant into a shared or common hopper that contains a high tension conveyor for the removal of proppant from the shared hopper.

FIG. 17 shows a shared hopper 1700 that may be used in place of shared hopper 1616 of FIG. 16. The hopper 1700 has four sides 1702, 1704, 1706, 1708 tapering inwardly and downwardly to guide proppant (not shown) by gravity flow towards a high tension conveyor 1710 residing at the bottom of common interior space 1712. Any number of proppant dispensing assemblies may be positioned around an upper periphery 1714 of the shared hopper 1700, such as proppant dispensing assemblies 1716, 1718, 1720, 1722 which each individually may discharge proppant, as described above, into the common interior space 1712. The proppant dispensing assemblies 1716-1722 may be actuated individually for the discharge of proppant, or more than one of the proppant dispensing assemblies 1716-1722 may be actuated simultaneously in any combination.

The high tension conveyor 1710 moves proppant in direction indicated by arrow 1724 towards a gate opening 1726, such as a rectangular gate opening, through the bottom of wall 1702. The proppant (not shown) passes through the gate opening 1726 and onto an elevator or metering conveyor 1728 that may be co-mounted with the shared hopper 1700 and the high tension conveyor 1710, all on a skid 1730. The metering conveyor 1728 rises for the discharge of proppant into a blender 1732. The blender 1732 may be, for example, a blender of the type commonly used in hydraulic fracturing operations and is used to mix the proppant with fluids and possibly also chemicals to form a frac fluid mixture for the hydraulic fracturing of a well.

Figure 18:
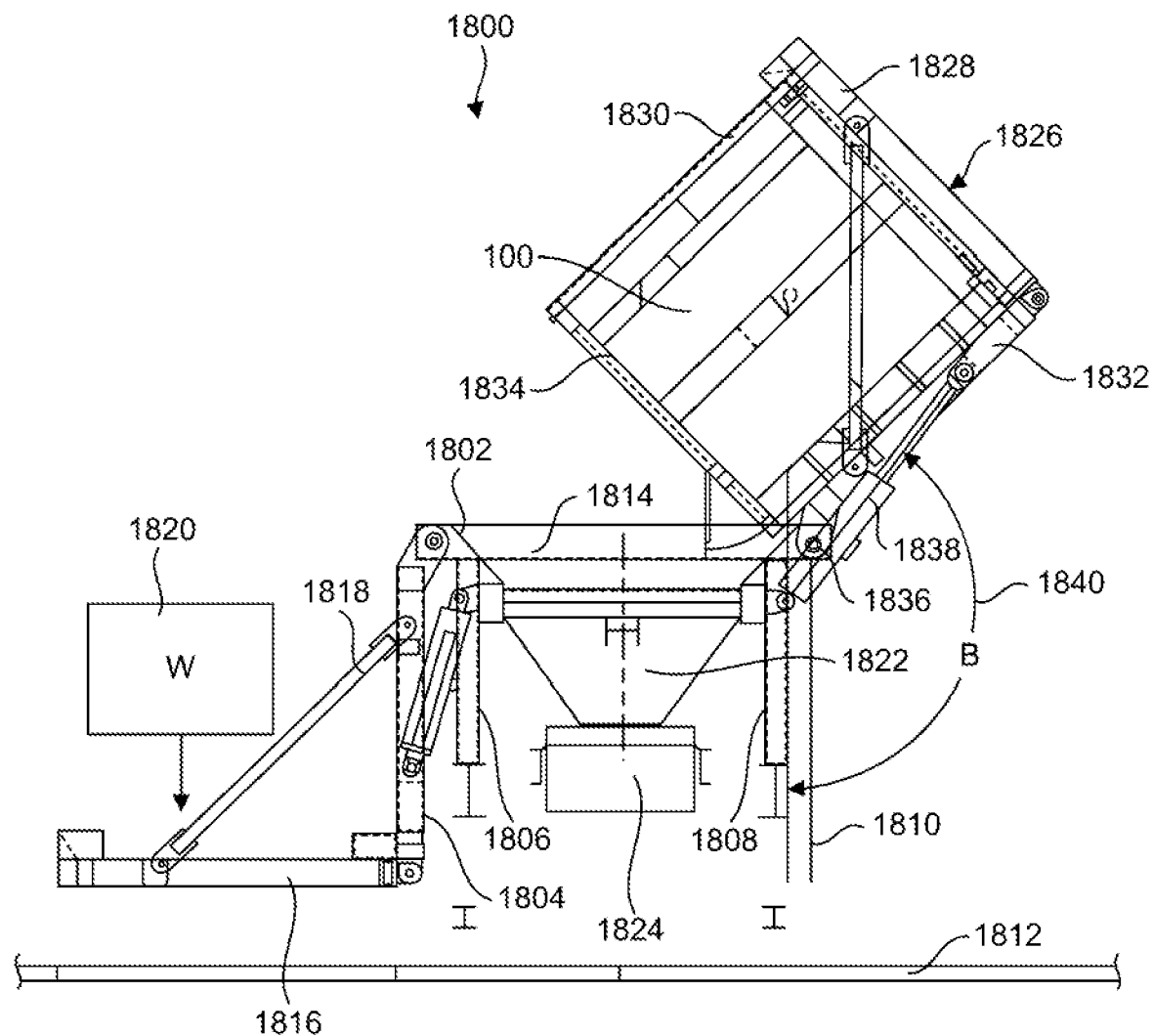
FIG. 18 shows an alternative embodiment of the proppant dispensing assembly.

FIG. 18 shows an alternative embodiment 1800 of the proppant dispensing system in which the tipping motion is hydraulically actuated. A support frame 1802 includes legs 1804, 1806, 1808, 1810, which rise upwardly from a ground surface 1812 to support a horizontal rectilinear frame 1814. A counterbalance platform 1816 and brace 1818 are provided to carry a counterweight system 1820 that stabilizes the support frame to prevent unwanted tipping or canting which might otherwise capsize the support frame 1802. A hopper 1822 resides on the support frame 1802 for discharge of proppant (not shown) onto a conveyor system 1824. A cradle 1826 is made of rectilinear frame members such as members 1828, 1830, 1832, 1834, which are constructed and arranged for selective retention of the proppant container 100 as described above. The frame member 1832 is attached to the horizontal rectilinear frame 1814 by a pivot 1836. A hydraulically actuator or ram 1838 extends between the frame member 1832 of the cradle 1826 and the horizontal rectilinear frame 1814 such that extension and retraction of the hydraulically actuated ram 1838 correspondingly induces a tipping motion along arc 1840. A range of motion or angle β along the arc 1840 may suitably be, for example, from about 0° when the proppant container 100 is vertical and frame member 1832 resides against leg 1810 to about 145° in the tipped configuration at the end of arc 1840 as shown in FIG. 18.

Figure 19:
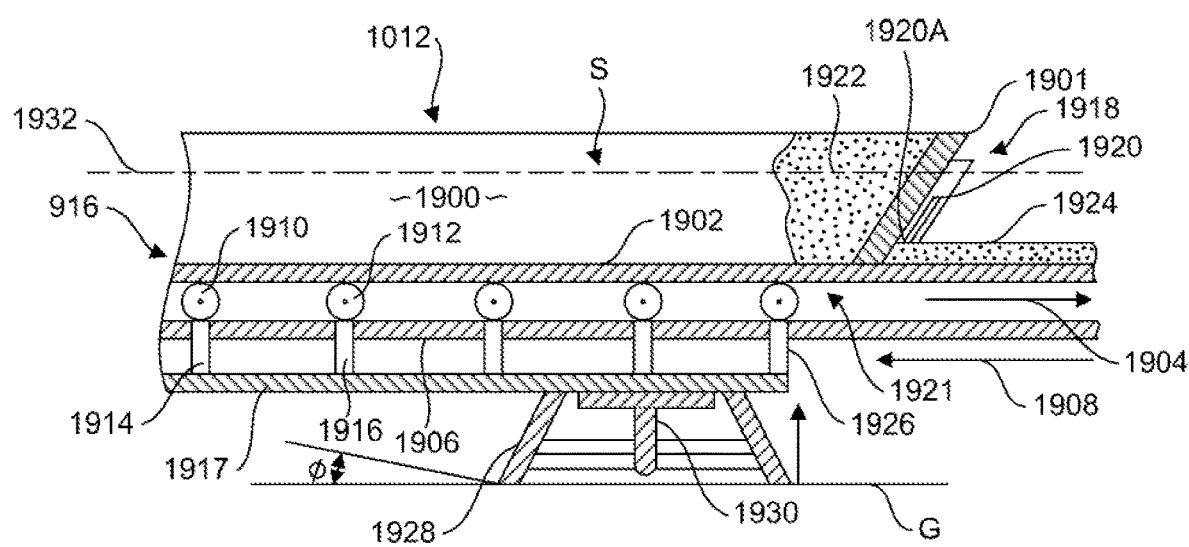
FIG. 19 is a midsection view taken along line 19-19' of FIG. 10.

FIG. 19 is a side midsection view taken from the perspective shown in line 19-19' of FIG. 10. Walls 1900, 1901 of the hopper 1012 provide boundaries defining interior reservoir S. The conveyor belt 916 is endless in the sense that it is formed as a loop having an upward side 1902 moving in direction 1904. Accordingly, a bottom side 1906 moves concomitantly in direction 1908 as the conveyor belt 916 continuously rotates. The conveyor belt 916 is supported by rollers 1910, 1912, which are supported by brackets or risers 1914, 1916 extending upwardly from a bottom wall 1917. A knife-edge gate assembly 1918 includes a plate 1920 that is clamped into a fixed position with respect to opening 1921 in wall 1901 through which the conveyor belt 916 passes at close tolerances to mitigate the external spillage of proppant. A bottom edge 1920A of the plate 1920 extends lower than the wall to define the uppermost extent of the area in opening 1921 that is available to permit the passage of proppant 1922 through the opening 1921. Accordingly, movement of the upper side 1902 of conveyor belt 916 in the direction 1904 carries proppant 1922 from within reservoir S and forms a ribbon 1924 of proppant having a uniform thickness. It is then a simple matter to compute a rate of proppant exiting the hopper 1012 based upon the volume of proppant that passes due to the rate of rotation of the belt 916. A distal end 1926 of hopper 1012 is supported by a jack 1928, which includes a brace structure operably mounting a screw and plate assembly 1930 that may be raised or lowered to adjust an angle φ that exists between the elongate axis 1932 of the hopper and ground G.

Figure 20:
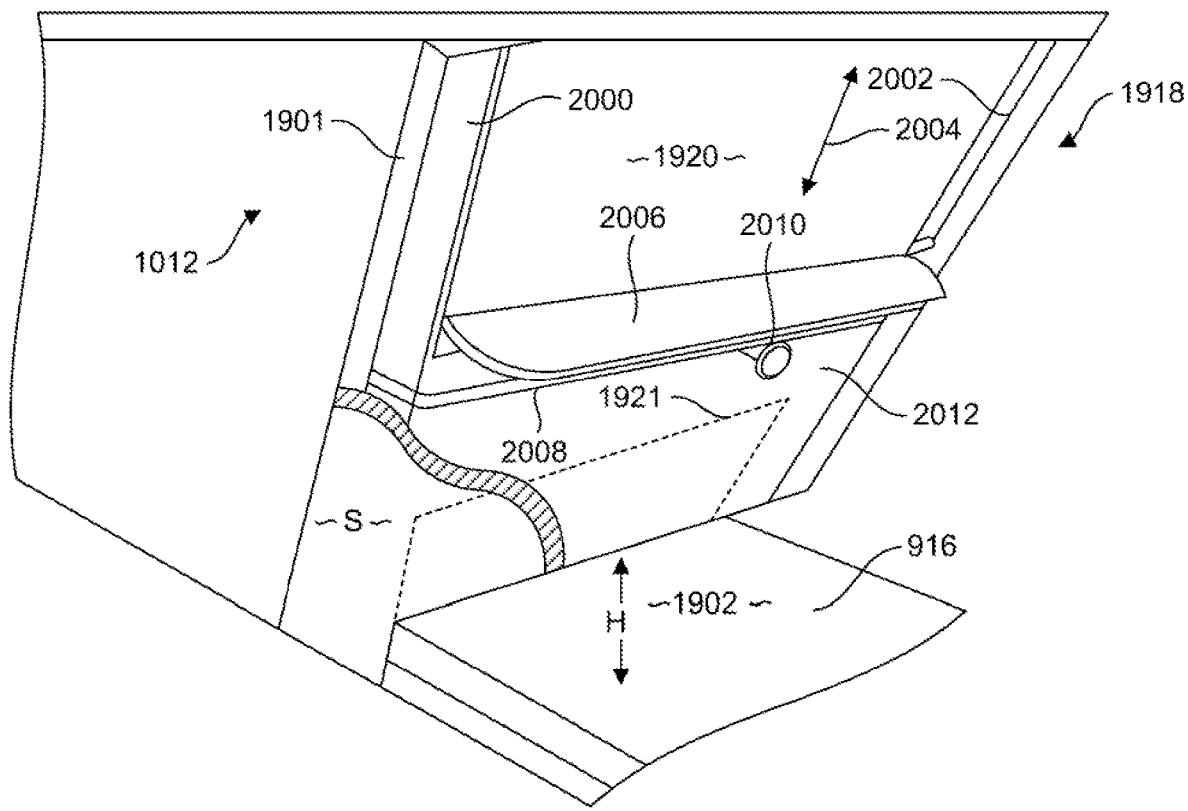
FIG. 20 is a left, front, top perspective view of a knife edge gate assembly used to dispense a ribbon of proppant having a uniform thickness.

FIG. 20 is a side front perspective view of the knife edge gate assembly 1918 in operation. The plate 1920 is slidingly engaged in channels 2000, 2002, which permit translatable motion of plate 1920 in the direction indicated by arrows 2004. The translation of plate 1920 with respect to the wall 1901 varies height H that rises above upper surface 1902 of conveyer belt 916 to control the thickness of proppant ribbon 1924 (FIG. 19). The channels 2002, 2002 may be, for example, welded to the wall 1901. In FIG. 20, the opening 1921 is shown in dashed outline, and a portion of wall 1012 is removed for purposes of illustration to show the interior space S of the hopper 1012. A finger tab 2006 is welded onto the middle portion of the plate 1920 to facilitate manual adjustments that vary the height H by moving the plate 1920 with respect to the opening 1921 and upper surface 1902 of conveyer belt 916. The channels 2000, 2002 support a horizontal brace 2008 that extends between the channels 2000, 2002. The brace 2008 contains a welded nut (not shown) that receives bolt 2010, which may be tightened to compress against surface 2012 of the plate 1920 with sufficient friction between the plate 1920 and the wall 1901 to lock the plate 1920 in place so that the height H is fixed to form a ribbon 1924 (see FIG. 19) of uniform thickness in the intended environment of use.

Figure 21:
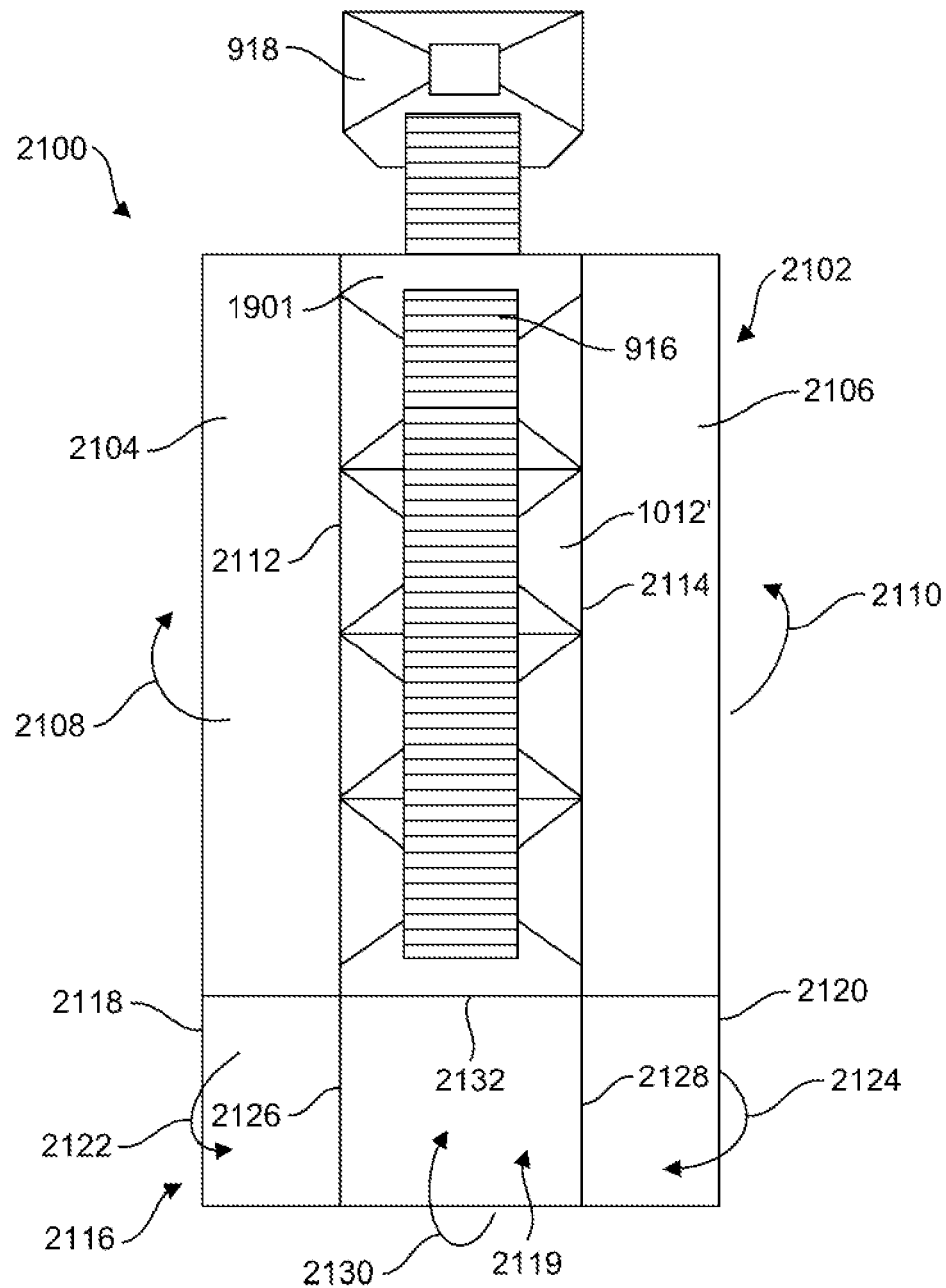
FIG. 21 is a top plane view of a proppant delivery system equipped with a ramp for use with a belly dump trailer.

FIG. 21 is top plan view of a proppant delivery system 2100 that eliminates the need for tippable proppant containers as, for example, the proppant container 100 as shown above in FIG. 1 together with its associated cradle 200 as shown in FIG. 2. As shown in FIG. 21, the proppant delivery system 2100 contains an endless conveyor belt 916, as described above, mounted in a hopper 1012'. The hopper 1012' differs from hopper 1012 shown in FIG. 10 in that the hopper 1012' is provided with a ramp 2102 permitting a belly dump truck (not shown) to drive over the hopper 1012'

When made ready for the discharge of proppant onto the conveyor belt 916, the belly dump truck will reside on ramp 2102 that is superimposed over the hopper 1012' such that proppant discharging from the belly dump truck will be deposited onto the conveyor belt 916 within the hopper 1012'. The conveyor belt 916 passes through wall 1901' of the hopper 1012' in the same manner as described above with respect to the conveyor belt 916 and the wall 1901 (FIG. 19). Multiple proppant dispensing systems 2100 may be positioned to discharge into a surge hopper or blender hopper 918. These additional systems may be, for example, be deployed to form a "Y" or a "T" for discharge into the blender hopper 918 as described above.

The ramp 2102 is provided with wings 2104, 2106 that pivot about respective axes 2112 and 2114, generally in the directions indicated by arrows 2108, 2110. The arrangement is such that the wings 2104, 2106 reside atop the hopper 1012' when the proppant delivery system 2100 is made-ready for roadable transport. Similarly, the ramp 2102 includes a tail section 2116 with side portions 2118, 2120 that border a middle portion 2119. The side portions 2118, 2120 pivot (i.e., generally in the directions indicated by arrows 2122 and 2124) about respective axes 2126, 2128 underneath the middle portion 2119 as the middle portion 2119 pivots (i.e., generally in the directions indicated by arrows 2130) upwardly on axis 2132 to reside vertically at the end of the hopper 1012'.

Figure 22:
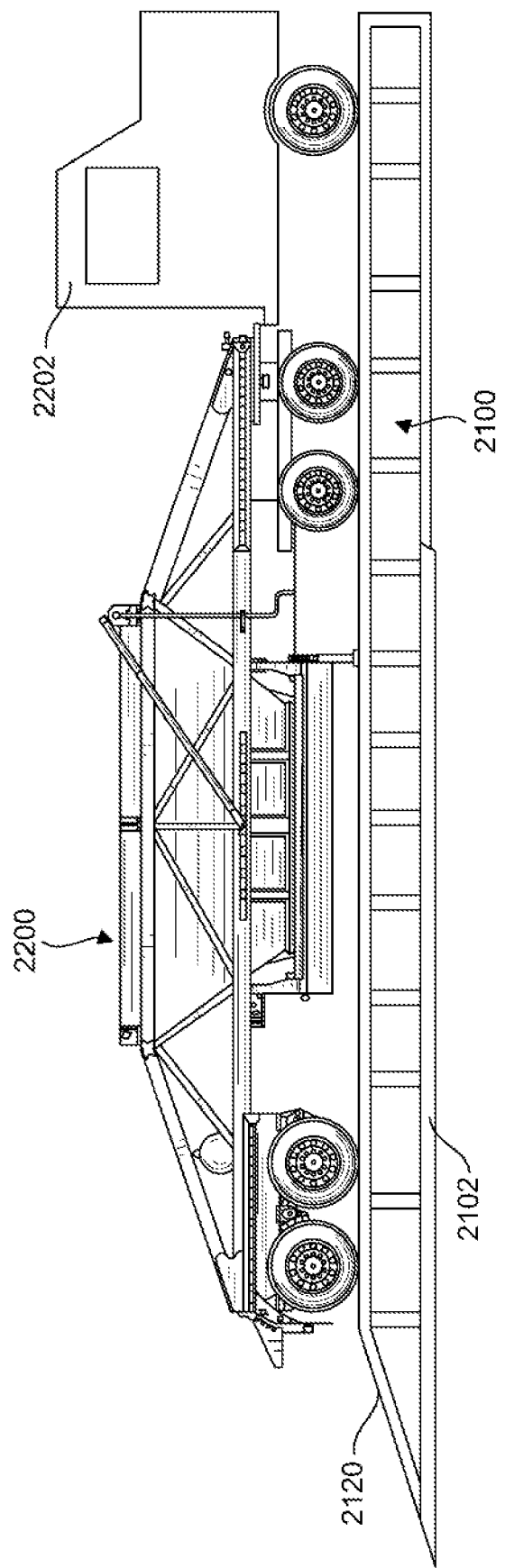
FIG. 22 is a side elevation view of a belly dump trailer positioned atop the ramp for delivery of proppant.

FIG. 22 is a side elevation view showing a belly dump trailer 2200 and tractor or truck 2202 positioned on the ramp 2100 for discharge of proppant into the hopper 1012' shown in FIG. 21.

Figure 23:
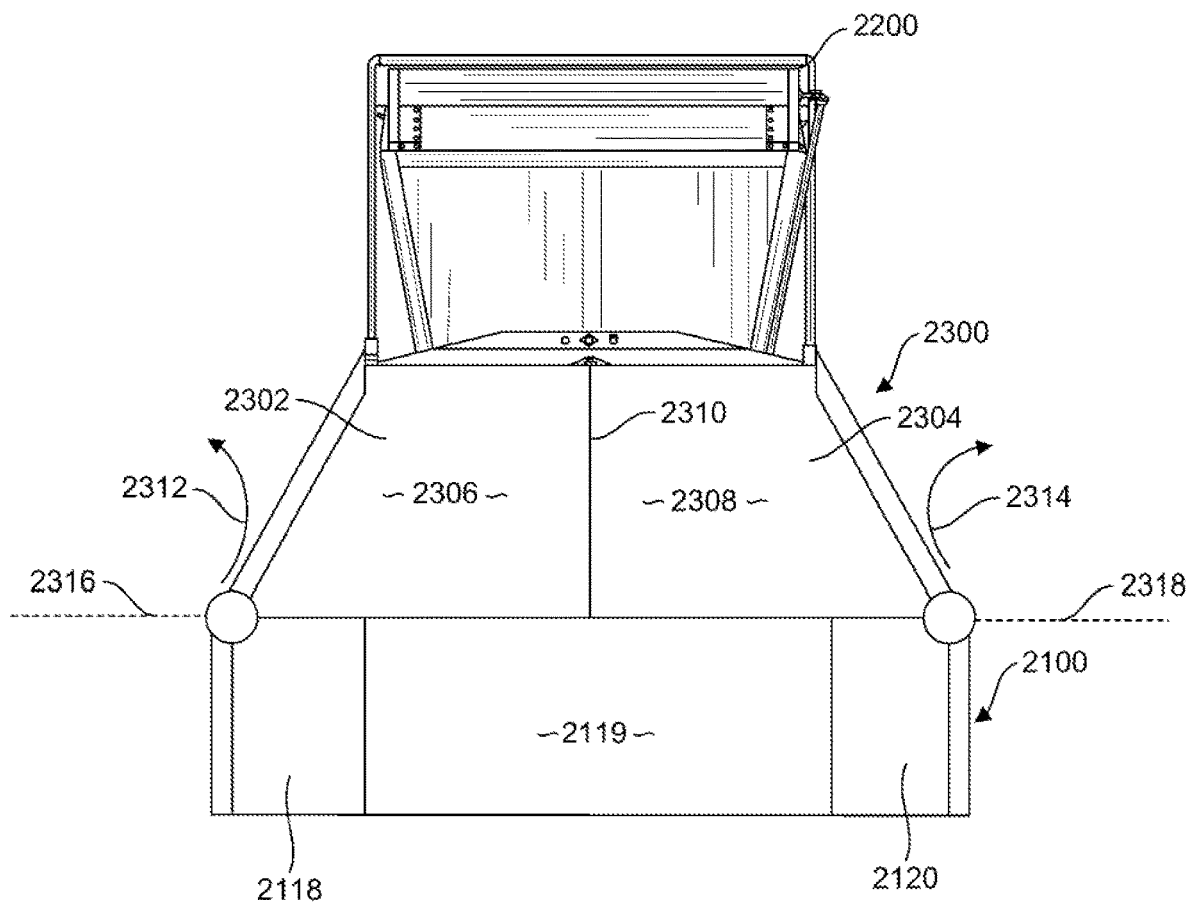
FIG. 23 is a rear view of the belly dump trailer positioned atop the ramp with dust mitigation skirt being additionally provided.

FIG. 23 is a rear elevation view of the belly dump trailer 2200 atop the ramp 2100. An optional clamshell 2300 is provided for purposes of dust mitigation. The clamshell includes two halves 2302, 2304 that run the full length of the belly dump trailer 2200 and the truck 2202 about which external panels 2306, 2308 seal the periphery for dust mitigation purposes. The halves 2303, 2304 slightly differ in length to provide overlap at junction 2310, which is repeated at the front of truck 2202 (not shown). The two halves are hydraulically actuated for pivoting motion 2312, 2314 to positions 2316, 2318 permitting egress of the belly dump trailer 2200 and truck 2202.

Figure 24:
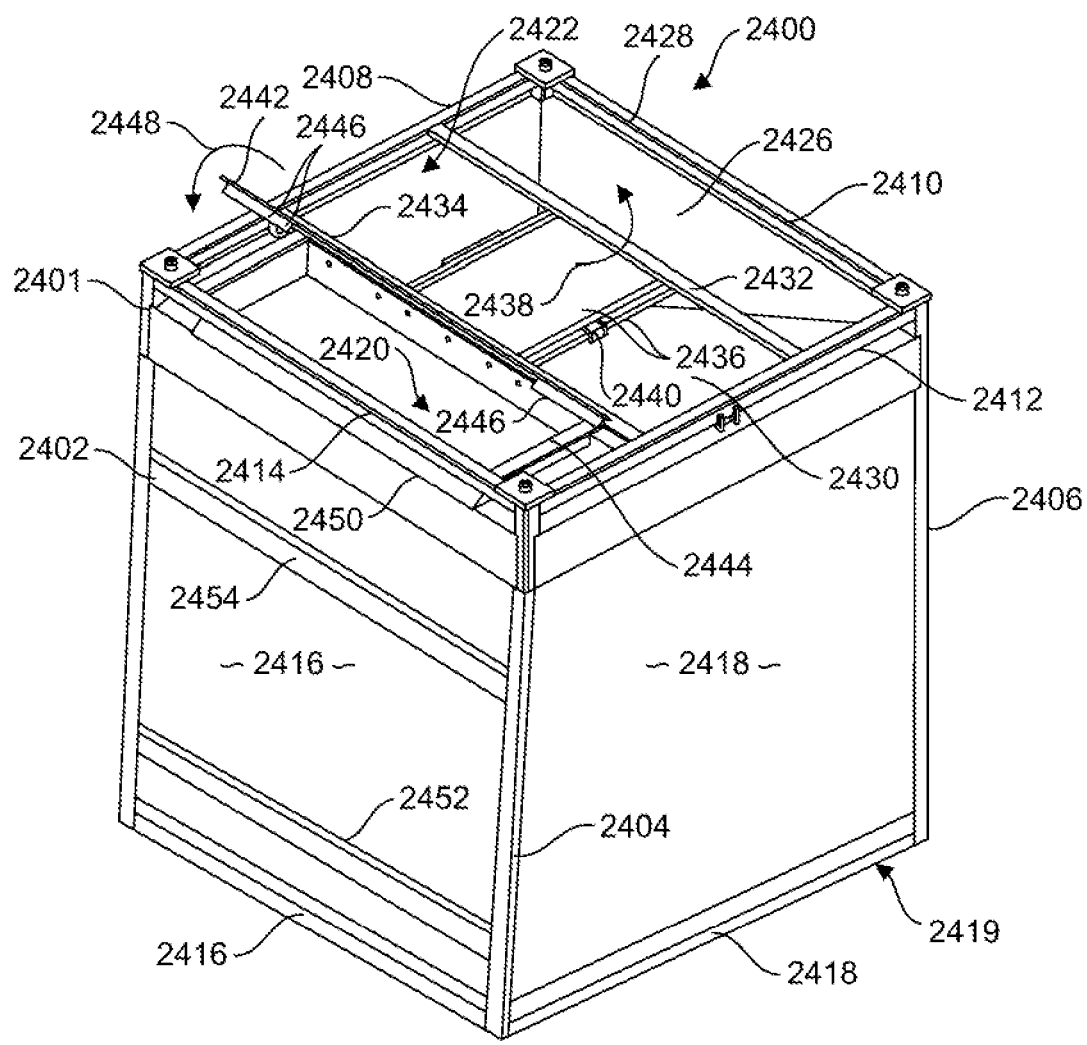
FIG. 24 shows an alternative proppant container that facilitates dispensation of proppant according to one embodiment.

FIG. 24 shows a proppant container 2400 that may, for example, be used in place of the container 100 described above. The proppant container 2400 has an external rectilinear frame 2401 including at least four upright members, such as 2402, 2404, 2406 (only 3 upright members are shown in FIG. 24), together with horizontal members 2408, 2410, 2412, 2414. Each face of the proppant container 2400 is covered by a panel, such as panels 2416, 2418 (only 2 panels are shown in FIG. 24), to define an interior reservoir 2420. The interior surfaces of the reservoir 2420 may be provided with a non-stick or friction-reducing coating, such as polytetrafluoroethylene, ceramic, silicone, porcelain, or a superhydrophobic material, to facilitate the discharge of proppant when wet. Alternatively, select surfaces may be so coated, such as the interior surface of front panel 2416. A bottom 2419 of the proppant container 2400 may be a solid panel and is optionally constructed without a hopper at the bottom because bottom discharge of proppant is not required. Alternatively, the bottom of the proppant container 2400 may be provided with a hopper in the manner shown in U.S. Pat. No. 9,758,082 to Eiden, discussed above.

A top assembly 2422 includes a first section 2426, which is a panel that rises from edge 2428 towards a middle section 2430. The middle section 2430 is bounded by two beams 2432, 2434 between which is formed a hatch 2436 that may pivot 2438 for filling the interior reservoir 2420 with proppant. The hatch 2436 is formed with a latch 2440 that may be locked to seal the proppant within the space 2420 during roadable transport. An additional hatch 2442 is larger than hatch 2436 and covers opening 2444 when closed. The hatch 2442 is mounted on one or more hinges 2446 such that the hatch 2442 opens away from the opening 2444 under the force of gravity to discharge proppant in the reservoir 2420 when the proppant container 2400 is pivoted forward to a position where front edge 2450 extends forward of and below the bottom forward horizontal member 2416. The hatch 2446 closes to seal the opening 2444 when this rotation is reversed. This pivoting motion may be, for example, the pivoting motion along path 237 as shown in FIG. 3 or along arc 1840 as shown in FIG. 18.

Figure 25:
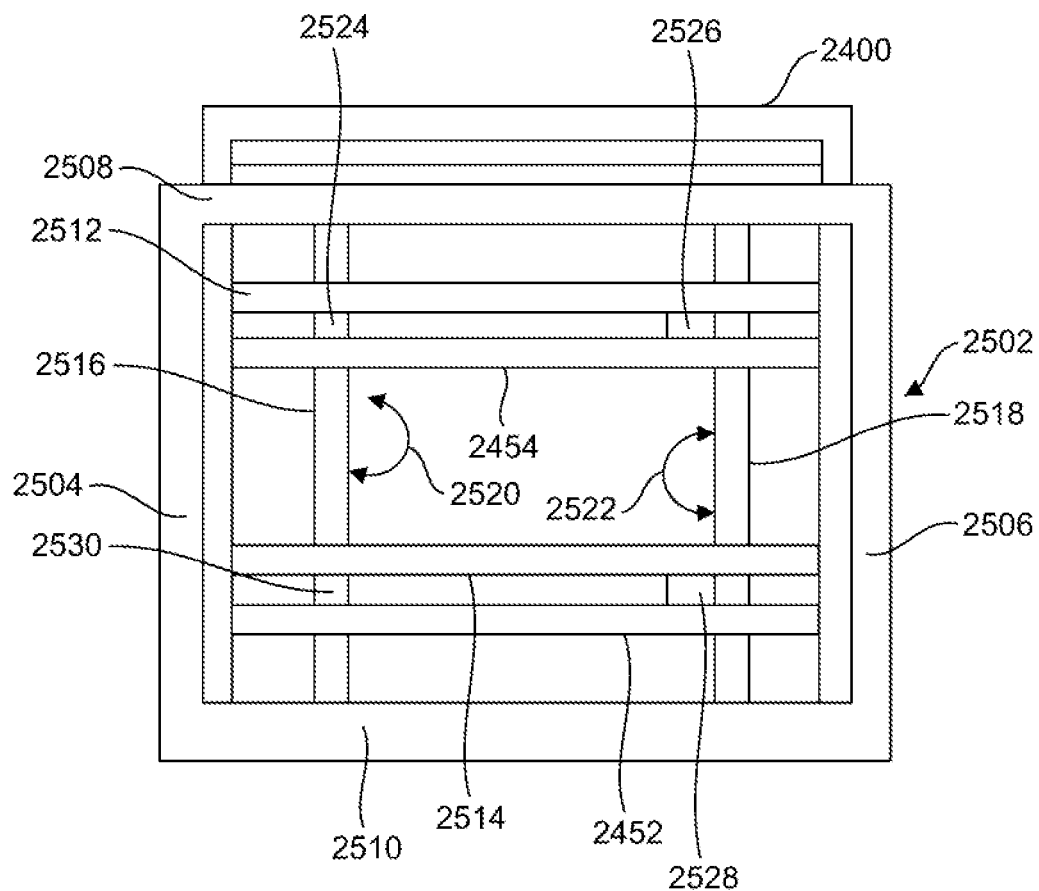
FIG. 25 shows the alternative proppant container positioned inside a rack that is equipped with a hydraulically actuated lock for retaining the proppant container when the rack is tipped.

Horizontal braces 2452, 2454 extend between uprights 2402, 2404 and are used for retention of the proppant container 2400 as the proppant container 2400 is tipped for the discharge of proppant from interior space 2420. This is accomplished as shown in FIG. 25, which is a front view of the proppant container 2400 positioned in a tippable holder 2502 that may be, for example, be used in place of the cage 204 as shown in FIG. 2 or the cradle 1826 as shown in FIG. 18. The front of holder 2502 is formed as a square including uprights 2504, 2506 and horizontal members 2508, 2510. Horizontal beams 2512, 2514 contain through-mounted elongate rods 2516, 2518 that are hydraulically actuated for axial pivoting motion 2420, 2522 to spin lugs 2524, 2526, 2528, 2530 into selective engagement with the horizontal braces 2452, 2454 of the proppant container 2400. As shown in FIG. 25, the lugs 2524, 2530 are spun or rotated to a release position residing forward and away from the braces 2452, 2454, while the lugs 2526, 2528 are spun or rotated rearward to a retention position that overlies the braces 2452, 2454. The proppant container is secured in place when both of the elongate rods 2516, 2518 reside in the retention position when the holder 2502 is tipped fully forward for the discharge of proppant as described above. Conversely, rotation of the elongate rods to the release position permits a forklift operator to lift the proppant container 2400 from the holder 2502 for replacement of the proppant container 2400 after the same is fully discharged.

As is the case also for proppant container 100, the proppant container 2400 is specially designed for dispensing wet proppant from the top of the proppant container 2400. Therefore, it is unnecessary to provide a bottom opening that is covered by a gate as shown in in U.S. Pat. No. 9,758,082 to Eiden, since discharge of proppant is intended to occur from the top opening 2444 (FIG. 24). In the intended environment of use, the Eiden-class containers require the use of a vibratory component to dislodge wet sand from within the containers, in part because the sidewalls of a bottom hopper element converge at a relatively small central discharge opening such that motive force is required to break cohesive forces and dislodge the sand. In practice, the heavy vibration needed to dislodge the sand damages the containers, increasing the frequency of repair. The relatively larger percentage of surface area of top opening 2444 preferably exceeds from about 25% to about 35% or more of the surface area of the top assembly 2422. In practice, dedicated vibration devices are advantageously not required to dislodge wet sand or other proppant from within the proppant container 2400. In the rare instances where simple tipping of the proppant container 2400 does not dislodge the sand, an operator may actuate the tipping mechanisms described herein in a relatively aggressive manner that imparts sufficient force to dislodge the sand.

Figure 26:
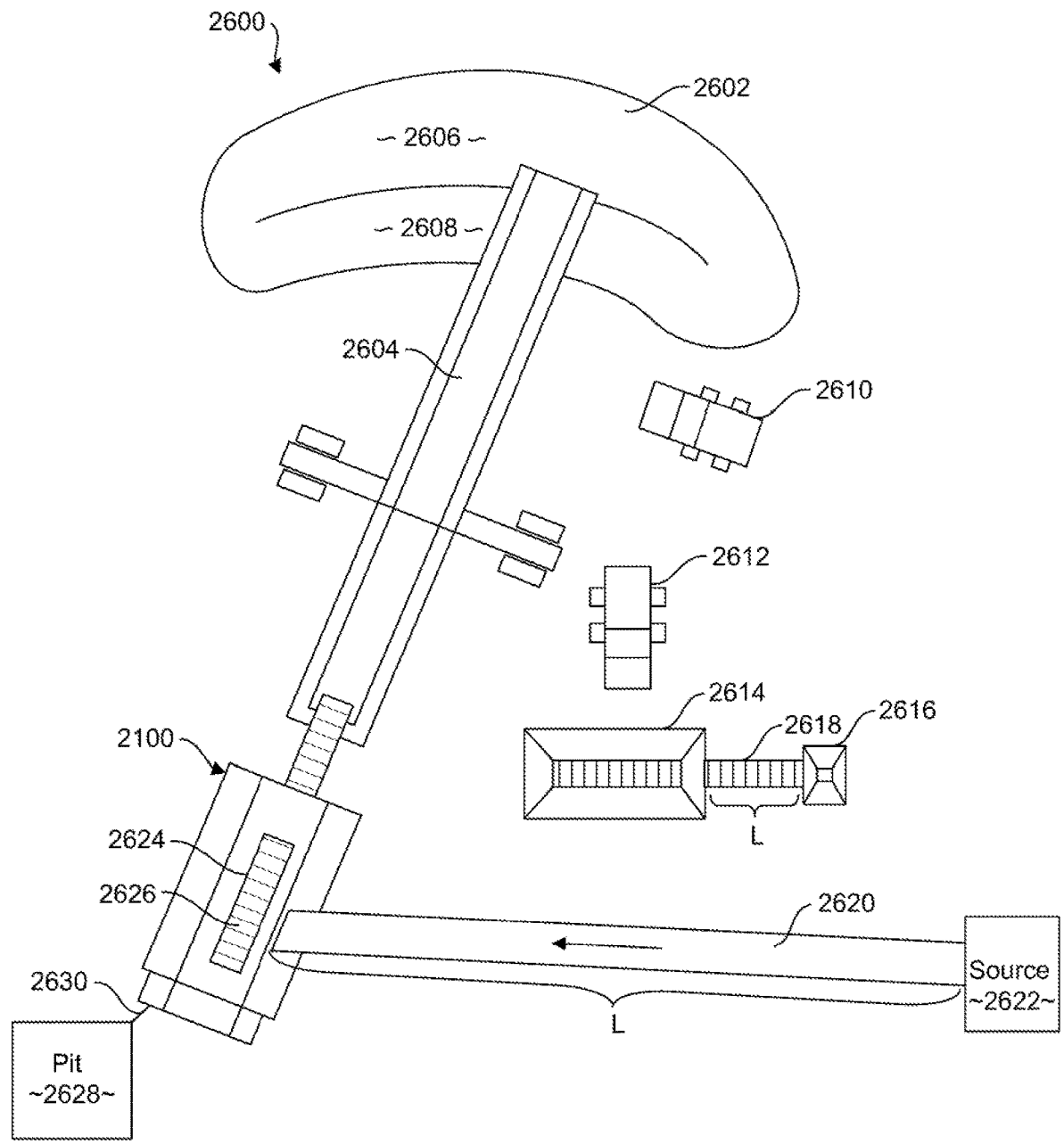
FIG. 26 is a wellsite location layout showing use of a long transport device for the movement of sand to a radial stacker for use with the system described above.

FIG. 26 is a location layout 2600 for use of bulk sand 2602 that may be wet sand for use as proppant. The bulk sand 2602 is deposited in a large mass that may, for example, be a large mound that contains all the sand that is needed for a hydraulic fracturing operation. The proppant delivery system 2100 above may be utilized to receive sand from belly dump trailers 2200 as described above, but as shown in FIG. 26, the proppant delivery system 2100 is deployed to deliver sand to a radial stacker 2604. The radial stacker 2604 may be, for example, a radial stacker as shown in U.S. Pat. No. 10,414,598 to McCloskey. Accordingly, the bulk sand 2602 may be stored in a plurality of tiers 2606, 2608, each of which be several stories tall. Any number of front end loaders 2610, 2612 are then used to transport sand from the pile of bulk sand 2602 to a conveyor/hopper system 2614 that feeds a blender hopper 2616 using a conveyor belt 2618. The hopper/conveyor system 2614 may, for example, be the hopper 1012 with conveyor 916 as shown in FIG. 10 except that, due to the use of bulk sand 2602, the proppant dispensing assemblies 901-908 and 1002-1008 are not required.

In the intended environment of use, a sand motive system, such as a conveyor belt or slurry pipeline, is used to carry proppant to the proppant delivery system 2100. A sand motive system 2620 may have a length L that runs any length and may be several miles in length. The sand motive system 2620 forms part of a system that is utilized, for example, to carry sand from a source 2622 that may be a mine or a central repository where sand is stored to supply a plurality of different wellsite locations with sufficient sand for use in hydraulic fracturing operates at each location. In the case of a slurry pipeline, it is preferred that the hopper of proppant delivery system 2100 have an open bottom 2624 discharging onto conveyor 2626 to facilitate dewatering of the slurry. Excess water is directed to a mud pit 2628 through trench 2630.

Figure 27:
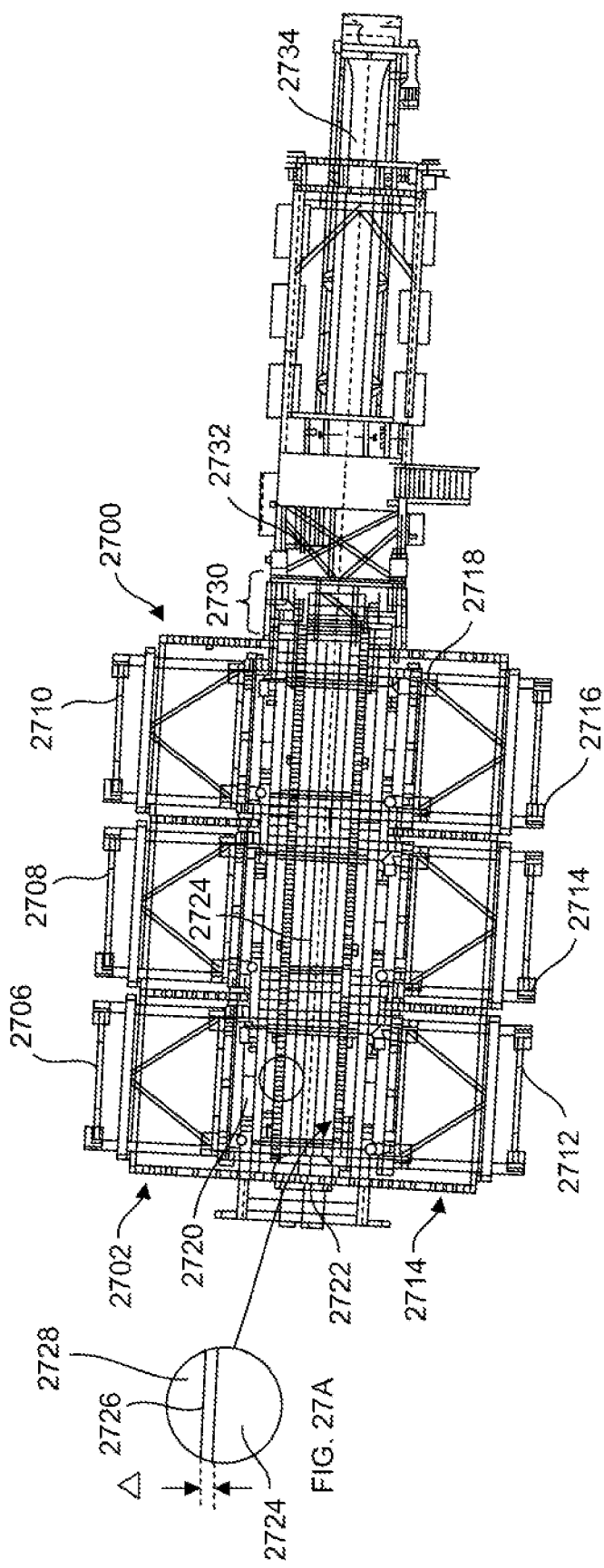
FIG. 27 is a top plan view of an ensemble formed as a central hopper that feeds a metering conveyor with opposing rows of proppant containers mounted in cradles that are deployed on opposite sides of the central hopper for load balancing thereof as the cradles are tipped to drain wet proppant into the central hopper.

FIG. 27 is a top plan view of a proppant dispensing system 2700 having two banks 2702, 2704 of cradles, including cradles 2706, 2708, 2710, 2712, 2714, 2716, mounted around a periphery 2718 of hopper 2720 for the tipping of proppant containers (not shown) as described above. The hopper 2720 has an open bottom 2722 for discharging proppant from within the hopper 2720 onto a conveyor belt 2724. As shown in FIG. 27A, a gap 2726 exists between the conveyor belt 2724 and an inwardly sloped wall 2728 of the hopper 2720. The gap 2726 is suitably sized to prevent excessing spillage of sand and undue equipment wear having, by way of example, a dimension of from about 0.04 in. (about 1 mm) to about 0.4 in (about 10 mm), and more preferably from about 0.08 in. (about 2 mm) to about 0.24 in. (about 6 mm). The conveyor belt 2720 has an extended section 2730 that discharges into a hopper 2732 feeding a metering conveyor system 2734. The metering conveyor system 2734 may be, for example, a metering conveyor as described in U.S. Pat. No. 10,989,018 to Oehler et al, which is hereby incorporated by reference to the same extent as though fully replicated herein.

Figure 28:
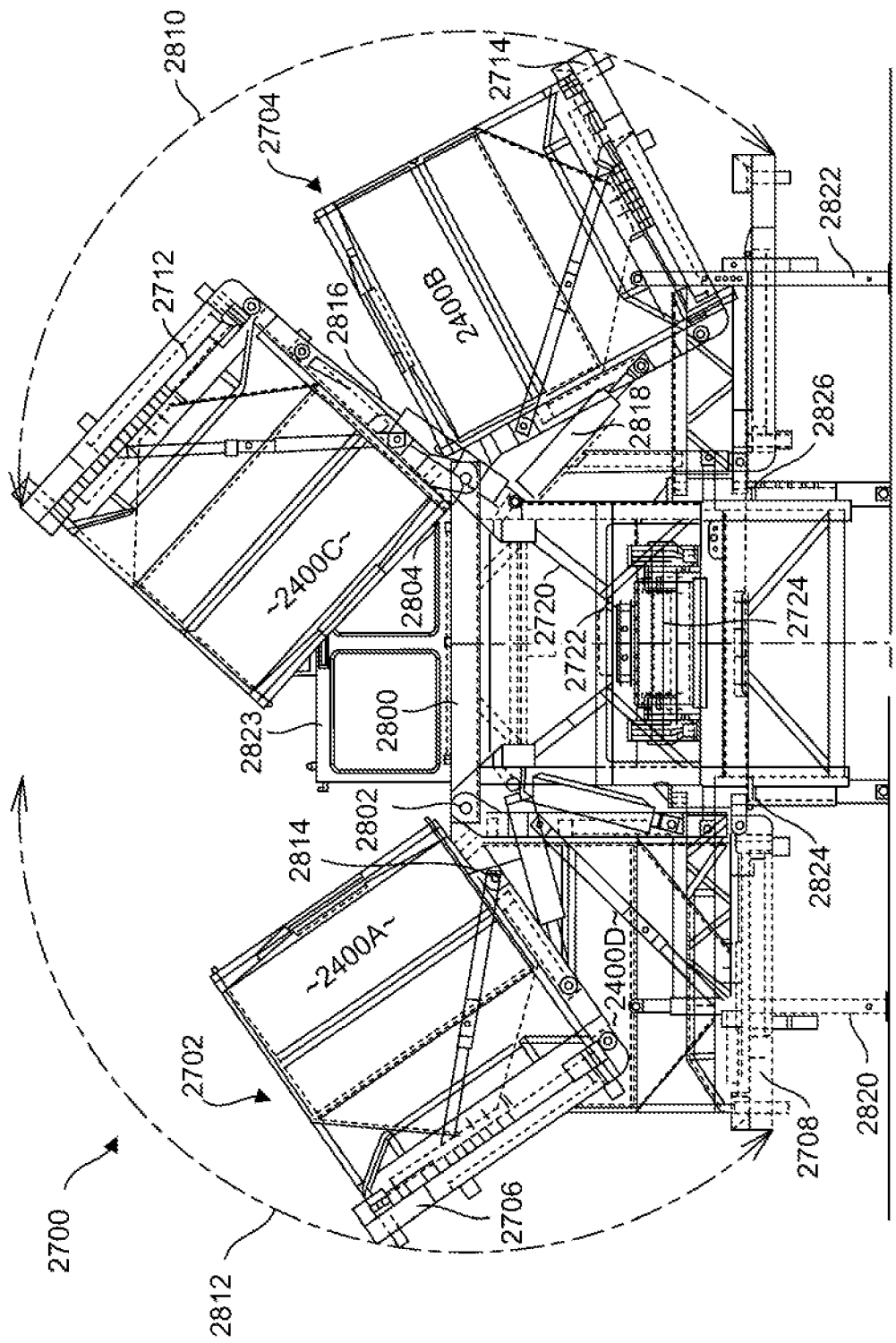
FIG. 28 is a rear view of the ensemble in an unfolded configuration for use at a wellsite location.
Figure 29:
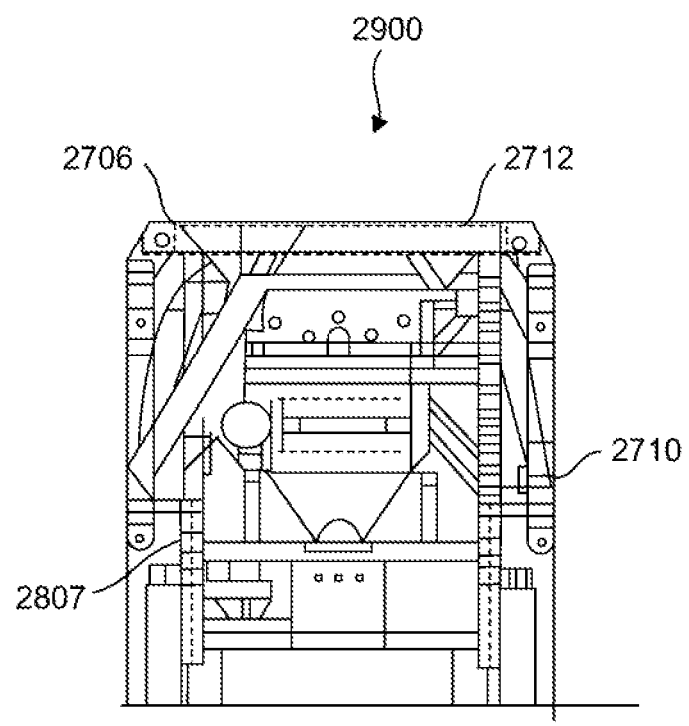
FIG. 29 is a folded configuration thereof made ready for roadable transport.
Figure 30:
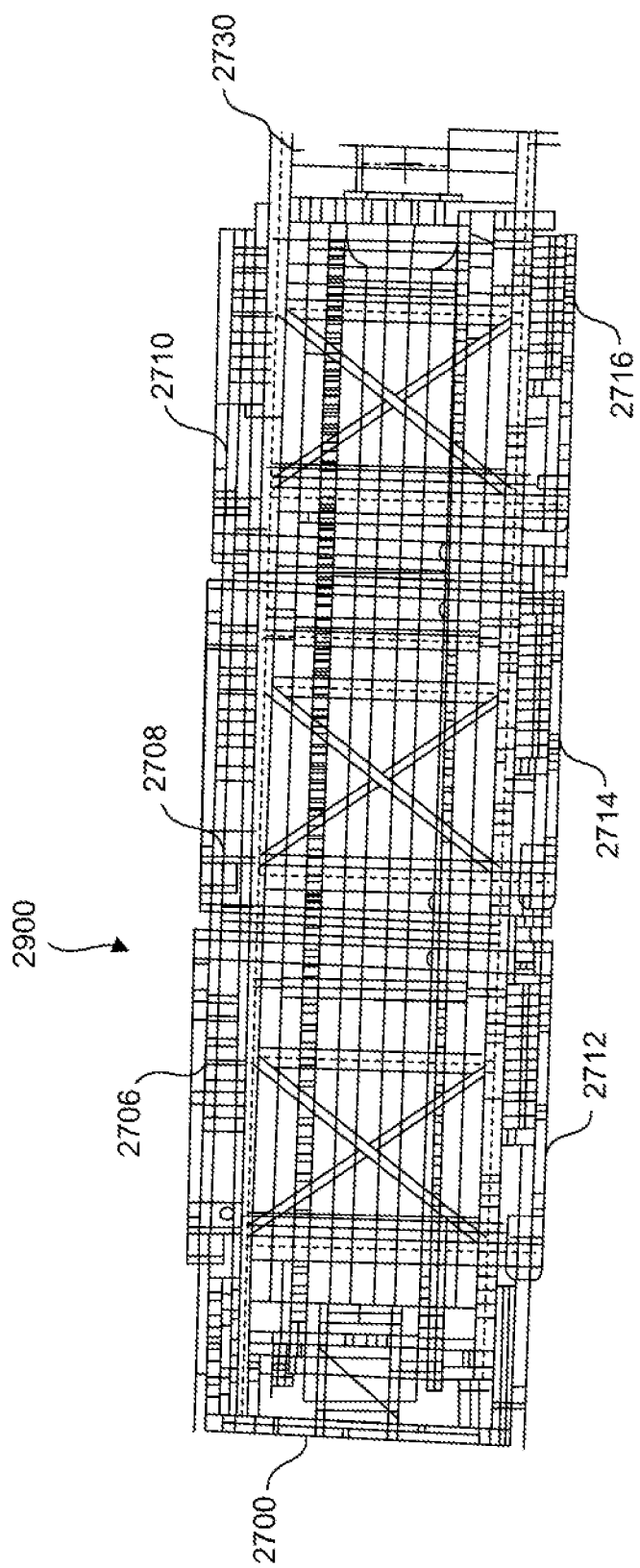
FIG. 30 is a top plan view of the ensemble in the folded configuration.

FIG. 28 is a rear view of the proppant dispensing system 2700. The various cradles 2706-2716 (for clarity only cradles 2706, 2708, 2712, and 2714 shown in FIG. 28) attached to a rectilinear support frame 2800 by clevis pins 2802, 2804 which form a pivot axis for rotational motions 2810, 2812 of the various cradles 2706-2716 under force provided by hydraulically actuated piston-cylinder assemblies 2814, 2816, 2918. When not being pivoted, the various cradles 2706-2716 are supported by upright ground-contacting legs 2820, 2822. As shown in FIG. 28, proppant containers, such as 2400A, 2400B, 2400C, and 2400D reside in respective cradles 2706, 2708, 2712, and 2714, which are being rotated for the discharge of proppant into the hopper 2720 for passage of the proppant through the open bottom 2722 onto the conveyor belt 2724. An operator control station 2823 may contain, for example, a graphical user interface or control buttons automating the tipping motion 2812, 2810 of cradles 2706-2716 (again, for clarity, only cradles 2706, 2708, 2712, and 2714 are shown in FIG. 28). The banks 2702, 2704 are located opposite one another across the hopper 2720 for load balancing of the central hopper as the removal of the proppant containers, e.g., proppant containers 2400A-2400D, followed by removal of the clevis pins 2802, 2804 permits separation of the various cradles 2706-2716 from the rectilinear support frame 2800, after which the upright support legs may be up-rotated around pivots 2824, 2826 into a vertical orientation residing flat against the rectilinear support frame 2800 in a folded configuration 2900 as is shown in FIGS. 29 and 30.

Those of ordinary skill in the art will understand that the foregoing discussion teaches by way of example and not be limitation. Accordingly, what is shown and described may be subjected to insubstantial change without departing from the scope and spirit of invention. The inventors hereby state their intention to rely upon the Doctrine of Equivalents, if needed, in protecting their full rights in the invention.

We claim:

1. A proppant dispensing system, comprising:
a plurality of proppant container systems each of which include
a proppant container, said proppant container including a container frame supporting a proppant reservoir, the proppant reservoir having a top, a bottom, and one or more sidewalls defining a reservoir between the top and the bottom, the bottom being closed to prevent flow of proppant from the reservoir through the bottom when proppant resides in the reservoir, the top being provided with means for permitting proppant to flow into the reservoir when the proppant container is in vertical or upright position, the top being provided with means for permitting proppant to flow out from the reservoir when proppant resides in the reservoir and the proppant container is tipped; and
a cradle with dimensions complementary to the proppant container for retention of the proppant container in the cradle, the proppant container residing in the cradle and being selectably removable therefrom;
a support frame rising from ground beneath the support frame and supporting each cradle of the plurality of proppant container systems in a manner permitting tipping motion of the cradle to a sufficient degree facilitating flow of proppant from the reservoir when proppant resides in the reservoir and the proppant container and cradle are tipped;
a plurality of tipping mechanisms respectively mounted between each cradle and the support frame, the tipping mechanisms including an actuator that is configured for selectively moving the cradle between a tipped position such that proppant flows from the reservoir when proppant resides in the reservoir and an untipped position such that proppant does not flow from the reservoir when proppant resides in the reservoir,
a central hopper positioned to receive proppant flowing directly from within each proppant container of the plurality of proppant containers when each proppant container of the plurality of proppant container systems is respectively tipped,
a horizontal conveyor belt system positioned to receive proppant from the central hopper;
a blending unit, and
an elevator conveyor equipped with a metering system to receive proppant flowing from the horizontal conveyor and lift the proppant towards the blending unit.

2. The proppant dispensing system of claim 1, wherein the bottom of each proppant container of the plurality of proppant container systems constitutes a solid wall having no opening therethrough.

3. The proppant dispensing system of claim 1, wherein the frame of each proppant container of the plurality of proppant container systems is a rectilinear frame having a plurality of upright elongate frame members and a plurality of horizontal elongate frame members.

4. The proppant dispensing system of claim 3, wherein the one or more sidewalls consists of a cylindrical sidewall.

5. The proppant dispensing system of claim 4, wherein the one or more sidewalls include a rectilinear structure made of a front sidewall, a rear sidewall opposed from the front sidewall, and a pair of opposed sidewalls each extending between the front sidewall and the rear sidewall.

6. The proppant dispensing system of claim 1, wherein each cradle of the plurality of proppant container systems has a first spindle on first side and a second spindle on a second side remote from the first side, the first spindle and the second spindle being in linear alignment permitting the tipping motion about an axis defined by the linear alignment of the first spindle and the second spindle.

7. The proppant dispensing system of claim 6, including at least one brace rising from the support frame to support a first aperture in which the first spindle is received and at least one other brace rising from the support frame to support a second aperture in which the second spindle is received.

8. The proppant dispensing system of claim 7 wherein the at least one brace includes a first plurality of braces rising from the support frame to support the first spindle and the at least one other brace includes a second plurality of braces.

9. The proppant dispensing system of claim 7, wherein the tipping mechanism includes an arcuate rack mounted on one of the cradle and the support frame and a motor-pinion assembly mounted on the other of the cradle and the support frame.

10. The proppant dispensing system of claim 9, the arcuate rack being mounted on the cradle.

11. The proppant dispensing system of claim 6, the top including a top wall with an opening therethrough, the at least one sidewall being a cylindrical sidewall, the opening being defined by a member running as a secant in parallel with the axis defined by the linear alignment of the first and second spindles.

12. The proppant dispensing system of claim 11, the cylindrical wall having an axis of symmetry perpendicular to the axis of linear alignment between the first spindle and the second spindle, the cylindrical wall defining an open cross-sectional area that is also perpendicular to the axis of symmetry such that the opening has an area encompassing from 10 percent to thirty percent of the open cross-sectional area.

13. The proppant dispensing system of claim 1, wherein the at least one sidewall is covered with insulation.

14. The proppant dispensing system of claim 13, further comprising an insulative cap covering the top.

15. The proppant dispensing system of claim 13, further comprising bottom insulation covering the bottom.

16. The proppant dispensing system of claim 13, further comprising an insulative cap covering the top and bottom insulation covering the bottom.

17. The proppant dispensing system of claim 1, wherein the at least one sidewall has a horizontal cross-section presenting a shape selected from the group consisting of: circular, square, rectangular, and combinations thereof.

18. The proppant dispensing system of claim 1, wherein the reservoir has an interior surface lined with a material having a coefficient of friction against sand that is less than the coefficient of friction of steel against sand.

19. The proppant dispensing system of claim 1, wherein the proppant container is sized to contain in the reservoir from about 20,000 pounds of sand to about 60,000 pounds of sand.

20. The proppant dispensing system of claim 1, further comprising means for determining an amount of proppant discharging from each of the proppant containers when tipped.

21. The proppant dispensing system of claim 20, wherein the means for determining includes load cells mounted on the cradle to assess the weight of each of the proppant containers over time.

22. The proppant dispensing system of claim 20, wherein the means for determining includes an empirical correlation developed using input parameters selected from the group consisting of time, angle of declination when tipping, and moisture content of the proppant.

23. The proppant dispensing system of claim 22, further comprising a blending unit positioned to receive proppant that has been transported on the conveyor belt, the input parameters further comprising an amount of proppant exiting the blending unit.

24. The proppant dispensing system of claim 1 further comprising:

a surge hopper that is positioned to receive proppant directly from the horizontal conveyor belt system.

25. The proppant dispensing system of claim 24 in which the central hopper has an opening in a side wall that defines a cross-sectional area restricting a flow of proppant from the central hopper, the horizontal conveyor belt being positioned within the central hopper for movement of proppant from within the central hopper towards the opening for movement of proppant therethrough and towards the elevator conveyor for transfer of proppant onto the elevator conveyor.

26. The proppant dispensing system of claim 24, further comprising a plurality of the proppant container systems with the respective horizontal conveyor belt systems oriented at right angles with respect to one another.

27. The proppant dispensing system of claim 26 in which the plurality of proppant container systems consists of two of the proppant container systems.

28. The proppant dispensing system of claim 26 in which the horizontal conveyor belt systems of the respective ones of the plurality of proppant dispensing systems form a scissortail with respect to the elevator conveyor when feeding the surge hopper.

29. The proppant dispensing system of claim 26 in which the plurality of proppant dispensing systems consists of three of the proppant dispensing systems.

30. The proppant dispensing system of claim 1, wherein each tipping mechanism of the plurality of tipping mechanisms includes a hydraulically actuated ram extending between the cradle and the support frame, the hydraulically actuated ram being operably mounted for extension and retraction to govern tipping motion of the cradle to control discharge of proppant from the proppant container.

\* \* \* \* \*